United States Patent
Dekoos

(10) Patent No.: US 9,929,928 B1
(45) Date of Patent: Mar. 27, 2018

(54) PACKET TRANSMITTER AND METHOD FOR TIMESTAMPING PACKETS

(71) Applicant: Microsemi Solutions (U.S.), Inc., Aliso Viejo, CA (US)

(72) Inventor: Andras Dekoos, Montreal (CA)

(73) Assignee: Microsemi Solutions (U.S.), Inc., Aliso Viejo, CA (US)

( * ) Notice: Subject to any disclaimer, the term of this patent is extended or adjusted under 35 U.S.C. 154(b) by 0 days.

(21) Appl. No.: 14/998,321

(22) Filed: Dec. 24, 2015

(51) Int. Cl.
*H04L 12/26* (2006.01)

(52) U.S. Cl.
CPC ........ *H04L 43/106* (2013.01); *H04L 43/0852* (2013.01)

(58) Field of Classification Search
CPC ... H04L 1/188; H04L 43/0852; H04L 43/106; H04L 47/10; H04L 47/2416; H04L 47/283; H04L 47/32; H04L 47/564; H04L 65/608; H04L 65/80; H04N 19/152; H04N 21/6437
See application file for complete search history.

(56) References Cited

U.S. PATENT DOCUMENTS

| | | | | |
|---|---|---|---|---|
| 5,402,416 A | * | 3/1995 | Cieslak | H04L 47/10 370/236 |
| 5,428,616 A | * | 6/1995 | Field | H04L 49/206 370/253 |
| 5,555,264 A | * | 9/1996 | Sallberg | H04L 12/5601 370/414 |
| 5,640,388 A | * | 6/1997 | Woodhead | H04J 3/0673 348/464 |

(Continued)

FOREIGN PATENT DOCUMENTS

| | | | | | |
|---|---|---|---|---|---|
| CN | 102318377 A | * | 1/2012 | | G08G 1/123 |
| DE | 69825531 D1 | * | 9/2004 | | H04L 43/50 |

(Continued)

OTHER PUBLICATIONS

IEEE 803.3-2012 sections, 1, 4 and 6, IEEE Standard for Ethernet, 2012.

(Continued)

*Primary Examiner* — Eric Nowlin
(74) *Attorney, Agent, or Firm* — Leber IP Law; Dennis R. Haszko

(57) ABSTRACT

A transmit datapath and a method for timestamping packets. The datapath comprises a timestamp unit located along a packet bus. The timestamp unit is configured to timestamp a packet with its predicted departure time onto a link, the predicted departure time based on an actual departure time of a preceding packet and the lengths of all intervening packets, when the packet bus has been continuously full of the intervening packets. The method comprises determining the predicted departure time of a packet based on an actual departure time of a preceding packet and the lengths of all intervening packets, minimizing the inter-frame gaps between the intervening packets, and timestamping the packet with the predicted departure time. The timestamp method may be a 1-step timestamp method. A packet may be timestamped with its predicted departure time upstream from where the packet is protected. The protection may be MACSec protection.

19 Claims, 11 Drawing Sheets

(56) References Cited

U.S. PATENT DOCUMENTS

| | | | | |
|---|---|---|---|---|
| 5,771,235 A * | 6/1998 | Tang | H04L 12/403 | 370/446 |
| 6,028,847 A * | 2/2000 | Beanland | H04L 43/50 | 370/252 |
| 6,134,217 A * | 10/2000 | Stiliadis | H04L 49/3081 | 370/232 |
| 6,351,471 B1 * | 2/2002 | Robinett | H04N 21/8547 | 370/468 |
| 6,360,271 B1 * | 3/2002 | Schuster | H04J 3/0632 | 370/516 |
| 6,512,761 B1 * | 1/2003 | Schuster | H04L 12/14 | 370/349 |
| 6,532,213 B1 * | 3/2003 | Chiussi | H04L 47/22 | 370/230.1 |
| 6,661,810 B1 * | 12/2003 | Skelly | H04J 3/0682 | 370/516 |
| 6,831,892 B2 * | 12/2004 | Robinett | H04N 21/8547 | 370/232 |
| 7,177,274 B2 * | 2/2007 | Van Der Zee | H04L 12/5693 | 370/230 |
| 7,230,923 B2 * | 6/2007 | Onvural | H04L 12/5602 | 370/235 |
| 7,283,483 B2 * | 10/2007 | Asawa | H04L 12/6418 | 370/230 |
| 7,327,693 B1 * | 2/2008 | Rivers | H04L 43/0852 | 370/252 |
| 7,542,415 B2 * | 6/2009 | Kang | H04L 47/10 | 370/229 |
| 7,590,061 B2 * | 9/2009 | Barry | H04L 47/10 | 370/230 |
| 7,596,644 B2 * | 9/2009 | Yu | G06F 13/28 | 370/230 |
| 7,616,570 B2 * | 11/2009 | Ronneke | H04L 12/5693 | 370/235 |
| 7,643,516 B2 * | 1/2010 | Degenhardt | H04L 29/06027 | 370/516 |
| 7,653,069 B2 * | 1/2010 | Lakshmanamurthy | H04L 47/60 | 370/388 |
| 7,724,750 B2 * | 5/2010 | Swami | H04L 12/5693 | 370/395.42 |
| 7,769,055 B2 * | 8/2010 | Le Ludec | H04J 3/0632 | 370/395.1 |
| 7,953,003 B2 * | 5/2011 | Moulsley | H04L 12/5693 | 370/229 |
| 8,050,284 B2 * | 11/2011 | Zhao | H04L 47/10 | 370/395.7 |
| 8,179,816 B1 * | 5/2012 | Vaidyanathan | G01S 1/024 | 370/252 |
| 8,194,556 B2 * | 6/2012 | Tacconi | H04L 12/5695 | 370/252 |
| 8,379,676 B1 * | 2/2013 | Daines | H04L 12/4666 | 370/505 |
| 8,437,369 B2 * | 5/2013 | Shaikli | H04J 3/047 | 370/412 |
| 8,565,133 B2 * | 10/2013 | Chen | G01S 13/878 | 370/310.2 |
| 8,670,466 B1 * | 3/2014 | Sathe | H04J 3/0673 | 370/235 |
| 8,718,482 B1 * | 5/2014 | Roberts | H04B 10/27 | 398/102 |
| 8,879,571 B2 * | 11/2014 | Ziegler | H04L 12/4633 | 370/235 |
| 8,937,963 B1 * | 1/2015 | Narasimha | H04L 47/22 | 370/410 |
| 8,990,552 B2 | 3/2015 | Kondapalli et al. | | |
| 9,071,554 B2 * | 6/2015 | Bui | H04L 47/622 | |
| 9,203,725 B2 * | 12/2015 | Ronchetti | H04L 43/0858 | |
| 9,445,227 B2 * | 9/2016 | Aldana | H04W 24/02 | |
| 9,515,941 B2 * | 12/2016 | Howes | H04L 47/22 | |
| 9,544,237 B1 * | 1/2017 | Lo | H04L 47/31 | |
| 9,674,104 B1 * | 6/2017 | Pan | H04L 47/50 | |
| 9,749,252 B2 * | 8/2017 | Katar | H04L 47/365 | |
| 9,794,141 B2 * | 10/2017 | Holbrook | H04L 43/062 | |
| 9,806,876 B2 * | 10/2017 | Biederman | H04L 7/0016 | |
| 2002/0021717 A1 * | 2/2002 | Hedayat | H04L 12/2697 | 370/508 |
| 2002/0131443 A1 * | 9/2002 | Robinett | H04N 21/8547 | 370/442 |
| 2002/0150115 A1 * | 10/2002 | Onvural | H04L 12/5602 | 370/411 |
| 2003/0128664 A1 * | 7/2003 | Connor | H04L 47/10 | 370/229 |
| 2003/0235202 A1 * | 12/2003 | Van Der Zee | H04L 12/5693 | 370/428 |
| 2004/0008736 A1 * | 1/2004 | Bae | H04N 21/23608 | 370/528 |
| 2005/0030899 A1 * | 2/2005 | Kang | H04L 47/10 | 370/236 |
| 2005/0105486 A1 * | 5/2005 | Robinett | H04N 21/8547 | 370/321 |
| 2005/0220097 A1 * | 10/2005 | Swami | H04L 12/5693 | 370/389 |
| 2005/0254423 A1 * | 11/2005 | Berghoff | H04L 47/10 | 370/230.1 |
| 2006/0029031 A1 * | 2/2006 | Koorapaty | H04W 56/0045 | 370/350 |
| 2006/0153148 A1 * | 7/2006 | Bichot | H04H 20/42 | 370/338 |
| 2007/0153803 A1 * | 7/2007 | Lakshmanamurthy, Sr. | H04L 47/60 | 370/395.43 |
| 2007/0174511 A1 * | 7/2007 | Yu | G06F 13/28 | 710/36 |
| 2007/0268931 A1 * | 11/2007 | Shaikli | H04J 3/047 | 370/468 |
| 2008/0089364 A1 * | 4/2008 | Barry | H04L 47/10 | 370/517 |
| 2008/0186989 A1 * | 8/2008 | Kim | H04L 47/6215 | 370/412 |
| 2009/0220238 A1 * | 9/2009 | Wang | H04L 47/10 | 398/79 |
| 2010/0150182 A1 * | 6/2010 | Noronha, Jr. | H04J 3/1682 | 370/537 |
| 2011/0072307 A1 * | 3/2011 | Hatley | H04L 12/2697 | 714/32 |
| 2012/0008646 A1 * | 1/2012 | Fourcand | H04J 3/0667 | 370/514 |
| 2012/0082156 A1 * | 4/2012 | Swartzentruber | H04L 41/147 | 370/389 |
| 2012/0106380 A1 * | 5/2012 | Vaidyanathan | G01S 1/024 | 370/252 |
| 2012/0140673 A1 * | 6/2012 | Tateno | H04J 3/1617 | 370/253 |
| 2012/0163521 A1 | 6/2012 | Kirrmann et al. | | |
| 2013/0028265 A1 * | 1/2013 | Ronchetti | H04J 3/0697 | 370/400 |
| 2013/0114601 A1 | 5/2013 | Branscomb | | |
| 2013/0142099 A1 * | 6/2013 | Shirakata | H04W 52/028 | 370/311 |
| 2013/0223243 A1 * | 8/2013 | Dhanapal | H04L 41/083 | 370/252 |
| 2014/0078915 A1 * | 3/2014 | Edsall | H04L 43/08 | 370/252 |
| 2014/0146677 A1 * | 5/2014 | Howes | H04L 47/22 | 370/235 |
| 2014/0160930 A1 * | 6/2014 | Kwon | H04W 16/26 | 370/235 |
| 2014/0241406 A1 * | 8/2014 | Yu | H04B 15/02 | 375/219 |
| 2014/0269379 A1 * | 9/2014 | Holbrook | H04L 43/0882 | 370/252 |
| 2014/0269749 A1 * | 9/2014 | Bui | H04L 47/622 | 370/412 |
| 2015/0055644 A1 * | 2/2015 | Bordogna | H04L 43/0852 | 370/350 |
| 2015/0063138 A1 * | 3/2015 | Aldana | H04W 24/02 | 370/252 |

(56) References Cited

U.S. PATENT DOCUMENTS

| | | | |
|---|---|---|---|
| 2015/0092545 A1* | 4/2015 | Katar | H04B 3/542 |
| | | | 370/230 |
| 2015/0318939 A1* | 11/2015 | Tsukamoto | H04J 3/06 |
| | | | 370/503 |
| 2015/0319572 A1* | 11/2015 | Jalali | G06K 7/10009 |
| | | | 455/456.1 |
| 2015/0350099 A1* | 12/2015 | Sun | H04L 65/80 |
| | | | 370/412 |
| 2016/0180857 A1* | 6/2016 | Reuschl | G10L 19/012 |
| | | | 704/503 |
| 2017/0033946 A1* | 2/2017 | Herrero | H04L 12/4633 |
| 2017/0127412 A1* | 5/2017 | Amizur | G01S 5/00 |
| 2017/0170985 A1* | 6/2017 | Lu | H04L 12/413 |

FOREIGN PATENT DOCUMENTS

| | | | | |
|---|---|---|---|---|
| EP | 0895375 A2 * | 2/1999 | | H04L 43/50 |
| EP | 0895375 A3 * | 7/2003 | | H04L 43/50 |
| EP | 0895375 B1 * | 8/2004 | | H04L 43/50 |
| GB | 2477474 A * | 8/2011 | | G08G 1/123 |
| WO | WO 2010060364 A1 * | 6/2010 | | G08G 1/123 |

OTHER PUBLICATIONS

IEEE 1588v2-2008, IEEE Standard for a Precision Clock Synchronization Protocol for Networked Measurement and Control Systems, 2008.

IEEE 802.1AE-2006, Media Access Control (MAC) Security, 2006.

IEEE 802.1AEbn-2011, Media Access Control (MAC) Security Amendment 1: Galois Counter Mode—Advanced Encryption Standard—256 (GCM-AES-256) Cipher Suite, 2011.

IEEE 802.1AEbw-2013, Media Access Control (MAC) Security Amendment 2: Extended Packet Numbering, 2013.

IEEE 802.1X-2010, Port-Based Network Access Control, 2010.

IETF RFC7384 Security Requirements of Time Protocols in Packet Switched Networks, Oct. 2014.

* cited by examiner

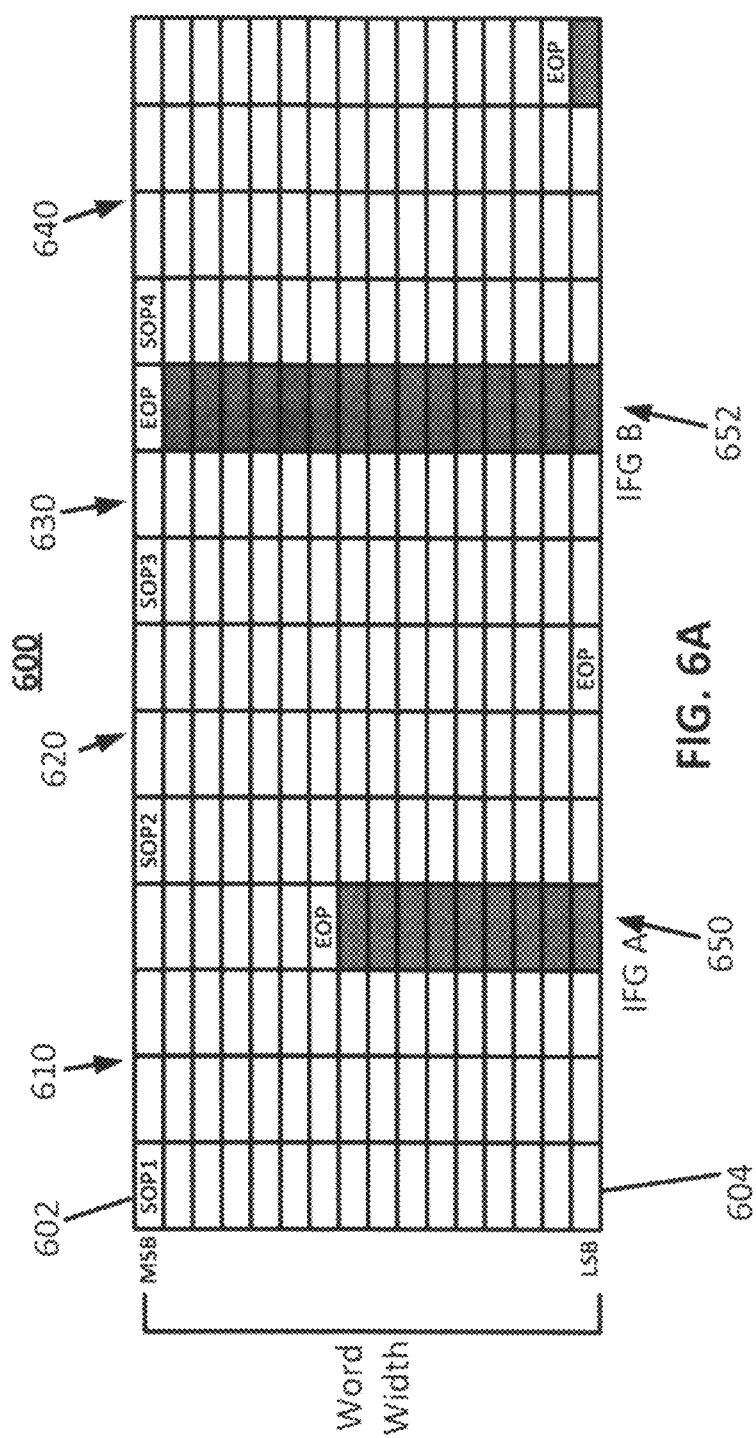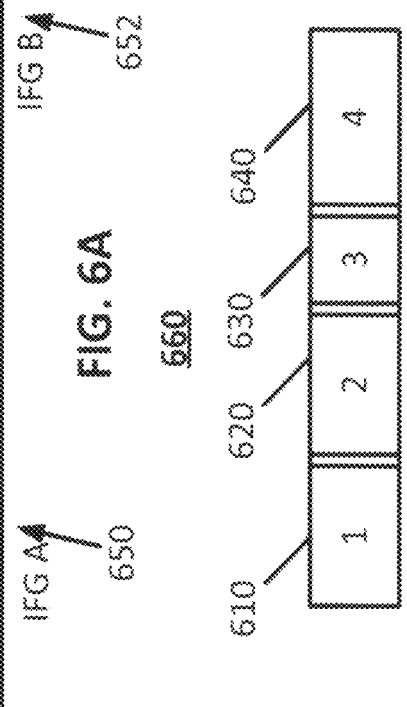
FIG. 6A
FIG. 6B

PACKET TRANSMITTER AND METHOD FOR TIMESTAMPING PACKETS

FIELD

The present disclosure relates generally to the field of networking. More particularly, the present disclosure relates to timestamping network packets.

BACKGROUND

An Ethernet network device comprises a packet transmitter. The packet transmitter has a transmit path. Packets proceed downstream the transmit path until transmitted by transmit logic to a network link. The transmitter comprises a packet bus and a number of logical blocks or units which perform operations on, or transform, the packets as they proceed downstream.

Maximizing the potential bandwidth of a transmit network device is important, especially in transport applications. Sub-maximal bandwidth may increase costs and result in the loss of revenue for network operators.

Precision Time Protocol (PTP), defined by the IEEE 1588 standard, is a way for devices on an Ethernet Network to accurately and precisely synchronize their internal clocks by timestamping and exchanging timestamped packets (also referred to as PTP messages or PTP packets). In PTP, a timestamp unit connected to the packet bus embeds a packet departure time into a packet prior to transmission. The embedded departure time is extracted from the packet on the receiving device across the network link and used for device synchronization. PTP requires the timestamped packet departure time to be very close to the actual or real departure time. For example, the timestamped packet departure time may need to be within 10 nanoseconds (ns) of the actual packet departure time.

There are two conventional PTP transmit timestamp methods. The 2-step PTP transmit timestamp method comprises detecting the departure time of a first event packet, and embedding that departure time in a second follow-up packet. The 1-step PTP timestamp method comprises embedding the departure time of an event packet in the event packet, itself, immediately before transmission.

The 1-step timestamp method is preferable to the 2-step timestamp method. In the 2-step method, devices at the sending and receiving ends need to track multiple packets (through hardware, firmware, or software) to determine the departure time of the event packet. For example, the transmitter device records the departure time of the event packet then creates and sends a follow-up packet containing the departure time of that event packet. The receiver device saves all event packets and associates them with the timestamp in follow-up packets. The complexity of the 2-step method is even greater for PTP transparent clocks (TCs) which might have many distinct PTP flows transiting through a single link at one time. The logic required to match the event packets with follow-up packets in such a situation is complex. Also, a 2-step method may require additional bandwidth on the outgoing link (which may not be available).

For a conventional 1-step timestamp method, packets are embedded with their departure times at the TxMAC after the packet bus. This is because the amount of latency experienced by a packet as it transits a packet bus is unpredictable and can vary significantly. It is not always possible, however, to 1-step timestamp a packet with its departure time at the TxMAC. For example, a MAC Security (MACSec) protection unit may protect a packet at some point along the packet bus, before the TxMAC, such that it cannot be validly modified thereafter.

Improvements in 1-step packet timestamping approaches, with minimal or no bandwidth loss, are desirable.

BRIEF DESCRIPTION OF THE FIGURES

FIG. 6A shows a representation of a portion of a packet bus having a word width.

FIG. 6B shows a representation of a portion of a serial bus for the packet bus shown in FIG. 6A.

DETAILED DESCRIPTION

Figure 1:
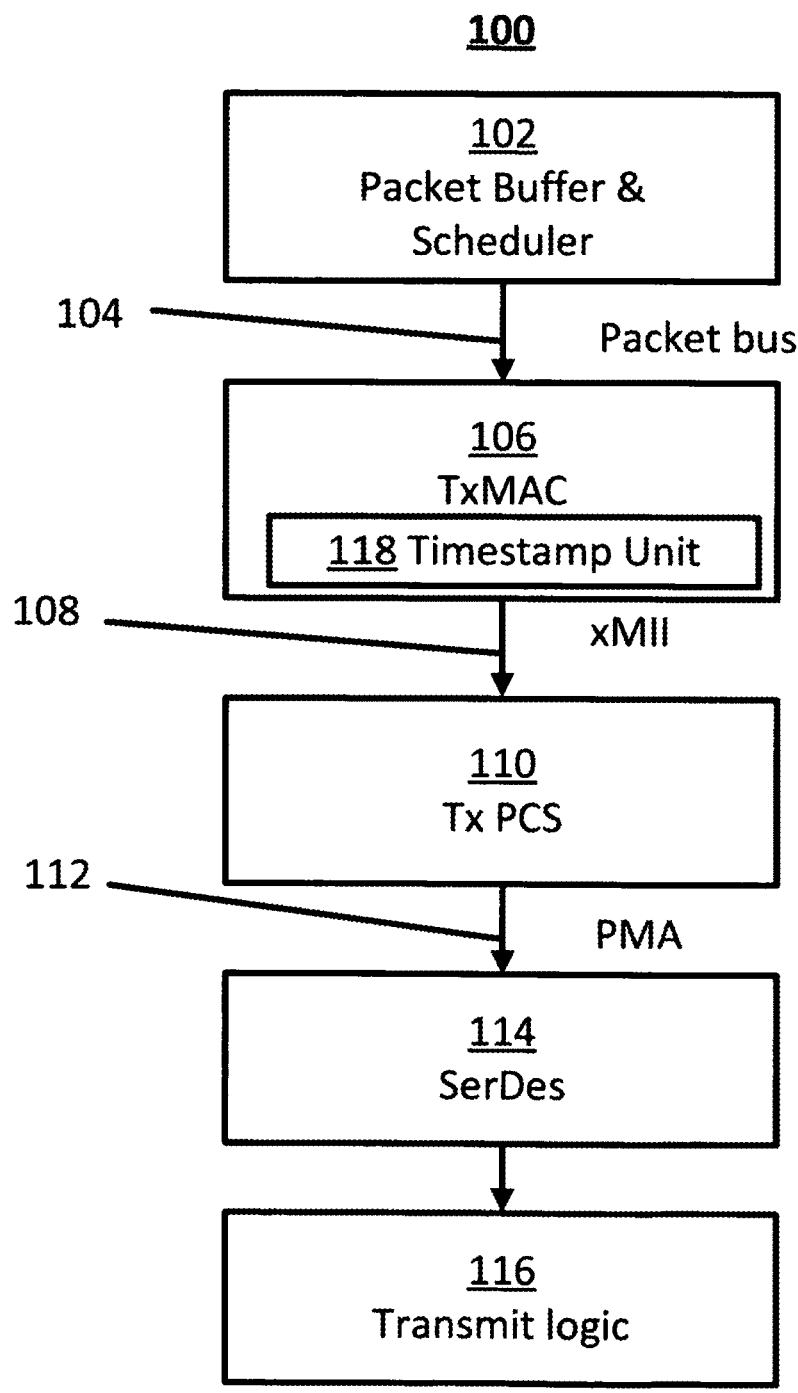
FIG. 1 shows a conventional transmit datapath of an Ethernet device.

A transmit datapath and a method for timestamping packets is described. The datapath comprises a timestamp unit located along a packet bus. The timestamp unit is configured to timestamp a packet with its predicted departure time onto a link, the predicted departure time based on an actual departure time of a preceding packet and the lengths of all intervening packets, when the packet bus has been continuously full of the intervening packets. The method comprises determining the predicted departure time of a packet based on an actual departure time of a preceding packet and the lengths of all intervening packets, minimizing the inter-frame gaps between the intervening packets, and timestamping the packet with the predicted departure time. The timestamp method may be a 1-step timestamp method. A packet may thus be timestamped with its predicted departure time upstream from where the packet is protected. The protection may be MACSec protection.

In accordance with an embodiment of the present disclosure, a predicted departure time of a selected packet is determined and embedded in the packet upstream from the TxMAC. The predicted departure time is based on the departure time of a preceding packet, and the final lengths of all intervening packets between the selected packet and the preceding packet. The inter-frame gaps between the intervening packets are made predictable by ensuring the packet bus is full of intervening packets as of the departure time of the preceding packet. Dummy packets may be inserted into the packet bus to keep the packet bus full. The observed difference between the actual departure times and predicted departure times of packets may be used to refine or correct the departure time of the selected packet.

In accordance with an embodiment of the present disclosure, a packet transmitter comprises: a packet bus; a timestamp unit located upstream from the packet bus, the timestamp unit configured to embed in a selected packet a predicted departure time to a network link of the selected packet; and a departure time prediction engine (DTPE) in communication with the timestamp unit, the DTPE configured to determine the predicted departure time of the selected packet based on an actual departure time to the network link of a preceding packet and the lengths of all intervening packets that transited the packet bus between the selected packet and the preceding packet, and in response to the packet bus being continuously full with the intervening packets since the actual departure time.

The DTPE may be configured to determine the predicted departure time of the selected packet based on the data communication rate of the network link.

The packet transmitter may comprise an xMII monitor in communication with the DTPE, the xMII monitor configured to monitor the xMII to determine the actual departure time to the network link of the preceding packet.

The selected packet may be a Precision Time Protocol (PTP) packet.

The DTPE may be configured to determine the predicted departure time of the selected packet based on inter-frame gaps between the intervening packets, and to determine the inter-frame gap between two intervening packets based on the inter-frame gaps of preceding intervening packets.

The DTPE may be configured to predict the inter-frame gaps based on a selected average inter-frame gap.

The packet transmitter may comprise a deficit-idle-counter (DIC) in communication with the DTPE, the DIC configured to select the inter-frame gap of each packet, the DTPE configured to predict the inter-frame gap of a packet based on a state of the DIC.

The DTPE may be configured to select the inter-frame gap of each frame.

The packet transmitter may comprise a packet protection unit in communication with the packet bus, the packet protection unit downstream from the timestamp unit, the packet protection unit configured to protect the selected packet.

The packet protection unit may be a MAC security protection unit.

The packet transmitter may comprise a dummy packet generator in communication with the packet bus, the dummy packet generator configured to add dummy packets to the packet bus to help ensure that the packet bus is full of packets downstream from the timestamp unit.

The dummy packet generator may be configured to add dummy packets to the packet bus in response to a PAUSE signal.

The dummy packet generator may be configured to generate and insert a control frame into the packet bus.

The DTPE may be configured to correct the predicted departure time of the selected packet based on a preceding actual departure time and a preceding predicted departure time of one of the intervening packets.

The packet transmitter may comprise a plurality of transmit lanes, the DTPE configured to determine the predicted departure time of the selected packet based on the number of the plurality of transmit lanes.

The timestamp unit may be located upstream from a transmit media access controller (TxMAC).

In accordance with an embodiment of the present disclosure, a method for timestamping a selected packet with a predicted departure time to a network link of the selected packet, comprises: determining an actual departure time of a preceding packet to the network link; determining lengths of all intervening packets between the selected packet and the preceding packet; determining the predicted departure time of the selected packet based on the actual departure time of the preceding packet and the lengths of the intervening packets, and in response to minimal inter-frame gaps after the intervening packets; and timestamping the selected packet, upstream from a packet bus, with the predicted departure time.

The method may comprise adding dummy packets into the packet bus to minimize the inter-frame gaps between the intervening packets.

The method may comprise determining inter-frame gaps after the intervening packets.

The method may comprise protecting the selected packet after timestamping the selected packet with the predicted departure time.

The method may comprise removing the dummy packets after the packet bus.

The method may comprise correcting the predicted departure time of the selected packet based on a subsequent actual departure time and a subsequent predicted departure time of one of the intervening packets.

The method may comprise determining the predicted departure time comprises determining a departure lane, from a plurality of transmit lanes, for a first block of the selected packet.

The method may comprise adding dummy packets to the packet bus in response to detecting a PAUSE signal.

The method may comprise correcting the predicted departure time based on the difference between two predicted departure time errors.

In accordance with an embodiment of the present disclosure, a computer-readable medium storing statements and instructions for execution by a processor to perform steps, comprises: determining an actual departure time of a preceding packet to a network link; determining lengths of all intervening packets between a selected packet and the preceding packet; determining a predicted departure time to the network link of the selected packet based on the actual departure time of the preceding packet and the lengths of the intervening packets, and in response to minimal inter-frame gaps after the intervening packets; and timestamping the selected packet, upstream from a packet bus, with the predicted departure time.

FIG. 1 shows a conventional transmit datapath 100 of a packet transmitter in an Ethernet device. Packets proceed downstream along the datapath 100 until transmitted across a link to a receiving Ethernet network device.

The transmit path 100 comprises a number of logical blocks/units including a packet buffer and scheduler 102, a Transmit Media Access Controller (TxMAC) 106, and a Transmit Physical Coding Sublayer (TxPCS) 110. These logic blocks perform required operations on the packets prior to sending across the link.

The transmit path 100 also comprises connections connecting the logical blocks including a packet bus 104, a Media Independent Interface (xMII) 108, and a Physical Medium Attachment (PMA) 112.

The TxMAC 106 adds a preamble, a frame-check sequence (FCS), and inter-frame gaps (IFGs) to each packet.

The TxPCS 110 encodes and scrambles packets. The Physical Medium Attachment (PMA) connects to a serializer-deserializer (SerDes) which serializes outgoing packets which are then transmitted to the network using a transmit logic 116.

The xMII 108 is a standard interface between the TxMAC 106 and the TxPCS 110. The xMII 108 is a representation of a serial stream such that serialized packets and the spaces therebetween are not modified once they are on the interface.

The packet bus 104 word width is typically at least 4 bytes. The packet bus 104 carries packets having a start-of-packet (SOP) and end-of-packet EOP indicator and other flags. The SOP of each packet is most significant byte (MSB) aligned on the packet bus 104. The SOP of each packet may also be least significant byte (LSB) aligned on the packet bus 104. Any space remaining in a word after the EOP of each packet on the packet bus 104 is unused.

A transmit datapath may have multiple channels. The packet bus 104 can be a time-division-multiplexed (TDM) so as to carry all channels on a single bus. Although each of the TxMAC 106 and TxPCS 110 logic units are shown in FIG. 1 as single blocks, logically, they may each comprise several blocks in parallel, one for each channel. Physically, the block may be a single instance that processes the bus in a time-division multiplexed fashion. Each PMA 112 would also attach to a distinct SerDes block. For example, 40 Gigabit Ethernet (GE) and 100 GE channels may be split across multiple PMA lanes 110, and each of which attaches to a distinct SerDes 114 block.

In this disclosure, the word "packet" may be used to refer to both "packets" and "frames". Frames are packets that have passed through a TxMAC and have been framed with, for example, a preamble, a start of frame delimiter, and a terminate character.

The Precision Time Protocol (PTP), which is defined in the IEEE 1588 standard, is a means to distribute timing information over devices on a network by exchanging PTP messages or PTP packets therebetween. The timing information is used to synchronize clocks/time on the devices. PTP depends, however, on PTP packets with timestamps that reflect their actual departure and arrival times from and at devices, respectively. The accuracy of the timestamps often needs to be very close to the actual departure or arrival times. The departure time refers to the time a packet is actually sent by the transmit logic 116.

There are two conventional methods for performing transmit PTP timestamping: the 1-step timestamp method and the 2-step timestamp method. In the 1-step method, the departure time of a PTP packet is embedded within the packet frame itself prior to transmission. The 1-step method puts the onus on hardware to modify the packet on-the-fly, embedding its departure time in the packet before transmission. In the 2-step timestamp method, the departure time of an event packet is recorded and sent in a follow-up packet some time later.

The 1-step method is preferable to the 2-step method because devices do not need to store the context information associated the event packet and the follow-up packet. Also, a 2-step outgoing stream requires extra bandwidth on the outgoing link (which may not be available).

Referring again to FIG. 1, a conventional implementation of the PTP comprises a timestamp unit 118 located in the TxMAC 106. The timestamp unit 118 embeds a departure time in a PTP packet. Although the timestamp unit 118 is located upstream from the transmit logic 116 (the location from which the departure time is based), it is possible to accurately calculate the actual departure time at the TxMAC 106. This is because the latency from the point of timestamp at the TxMAC 106 to the transmit logic 116 is relatively predictable and bounded to meet the required tolerance of the specific implementation. The greatest amount of variability results from the TxPCS 110. Even greater accuracy, possibly to within +/−1 ns, may be achieved by modeling the state of the TxPCS 110 and using a high clock frequency.

The xMII 108 is the standard interface between the TxMAC 106 and the TxPCS 110. The xMII 108 is essentially a representation of a serial stream such that no bytes are inserted or deleted after that point, with the exception of alignment markers that may be inserted for certain Ethernet communication rates, but can be taken into account. Since the xMII 106 is essentially a serial stream, the latency from the time-stamp point 118 through the TxPCS 110 is known and predictable. Accordingly, the departure time of a packet, that is embedded into the packet, is the time when the start-of-packet bit is present at the timestamp point (current time) plus the latency (the amount of time required by the packet to travel) from the time-stamp point to the pins of the transmit logic 116.

Figure 2A:
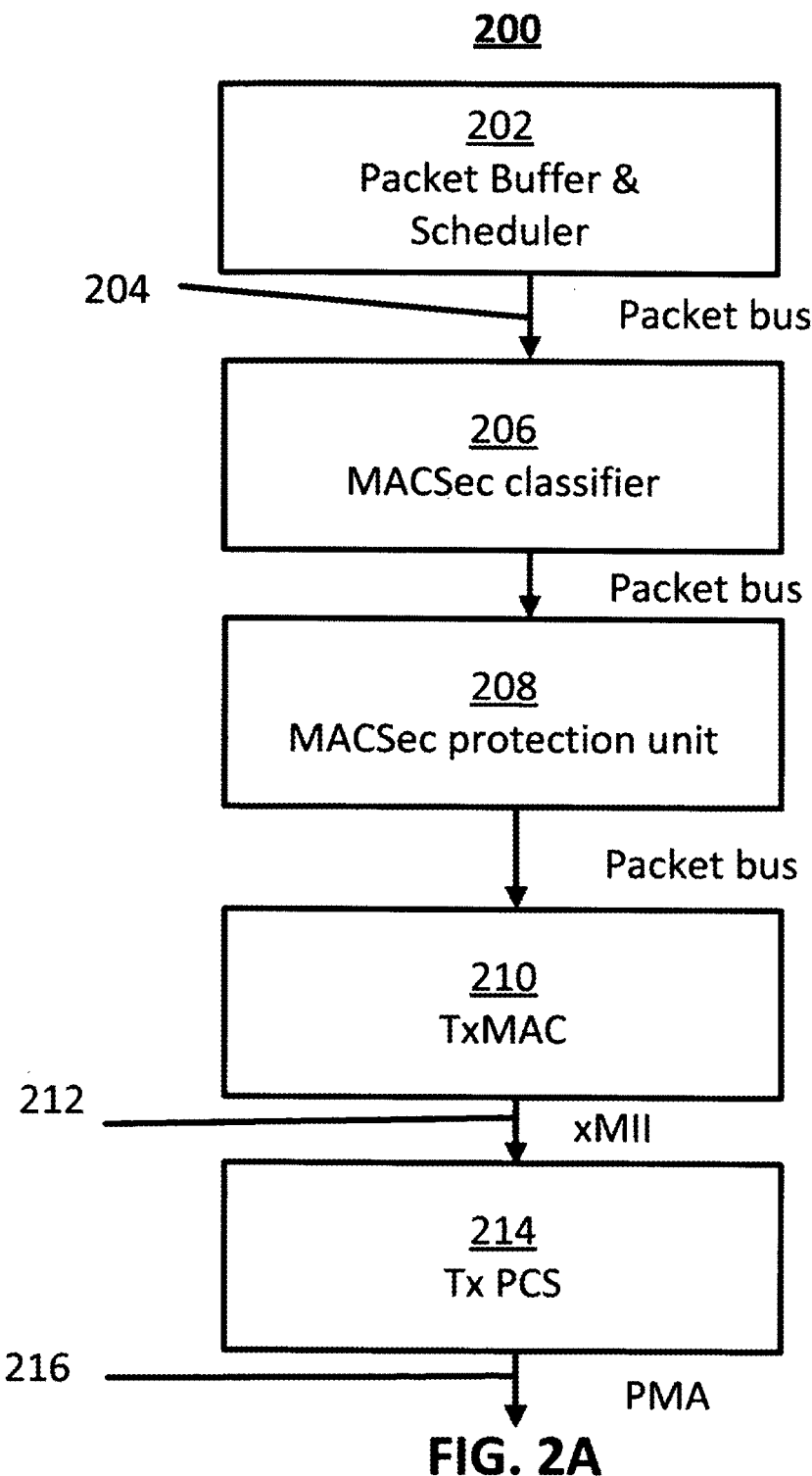
FIG. 2A shows a portion of a transmit datapath comprising MAC Security protection.

FIG. 2A shows a portion of a transmit datapath 200 similar to transmit datapath 100 of FIG. 1, the difference being that it comprises MACSec protection units 206,208. MACSec protection is a method to protect packets transmitted across an Ethernet network from unauthorized activities. MACSec-protected packets are at least integrity-protected (to prevent modification, malicious or otherwise), and may also be encrypted (to prevent snooping). MACSec integrity-protection comprises adding an Integrity Check Value (ICV) to packets prior to transmission. If a protected packet's contents are modified during transmission or otherwise, the ICV transmitted with the packet will not match the ICV calculated by the receiving device of the received packet.

Not all packets in a channel need be protected. Certain packet types, or certain flows within an Ethernet channel, may have different MACSec protection configurations. For this reason, the MACSec protection may be divided into two parts: classification (deciding whether/how to protect a packet) which is performed by a MACSec classifier unit 206, and protection (performing the optional encryption and adding of the SECTag and ICV fields) which is performed by a MACSec protection unit 208. The MACSec classifier 206 output contains all the needed classification results that the MACSec protection unit 208 requires to secure the packets.

Figure 2B:
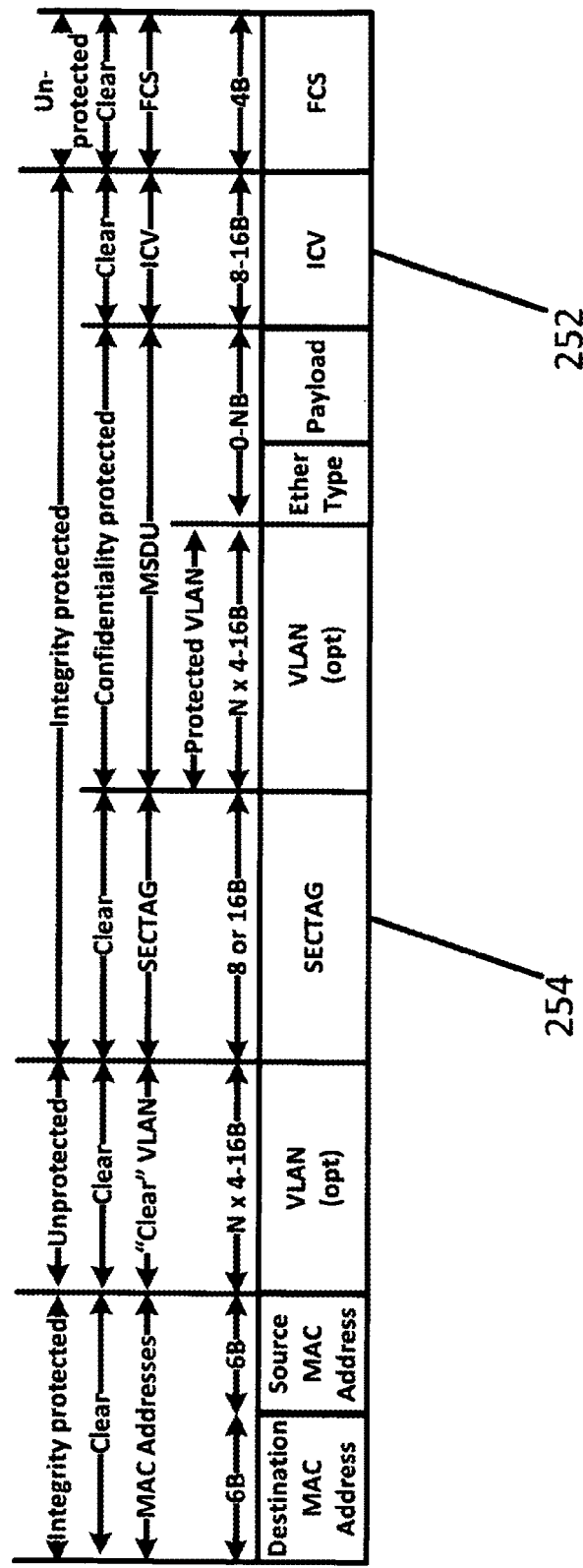
FIG. 2B shows a representation of fields of a packet.

FIG. 2B shows a representation of the fields of a packet 250, including the ICV field 252 and the SECTAG field.

MACSec protection is incompatible with conventional 1-step transmit PTP timestamping. Timestamping needs to occur after protection so that the departure time is accurate, but a packet cannot be timestamped after being protected. In conventional 1-step PTP timestamping, the departure time of a packet is captured and embedded in the packet at a location as close as possible to the transmit logic such as in the TxMAC 206 to help ensure the accuracy of the timestamped departure time. MACSec protection, however, secures packets such that they cannot be modified at all after being protected (even if the modification occurred in the datapath 200). And MACSec protection must occur upstream from the TxMAC 210.

Although the 2-step PTP timestamping method is compatible with MACSec protection, 2-step timestamping has a number of problems as discussed above. It is also not a solution to leave PTP packets unsecured to permit 1-step PTP timestamping. If other packets from the same stream need to be secured, then the PTP packets also need to be secured. Timing information conveyed over PTP may be sensitive. Not securing PTP packets could potentially allow malicious agents to cause networks and equipment to have the wrong time of day which can, in turn, lead to real-world problems.

It is desirable to have a solution which permits 1-step timestamping of secured PTP packets.

One possible solution is to place the timestamp logic further upstream such that a PTP packet is timestamped with its departure time prior to being secured. This ensures that the integrity of the secured packet is not compromised by the 1-step timestamp. Timestamping a packet with its departure time before it is actually transmitted, however, requires the departure time to be determined in advance of transmission.

Accurately predicting the departure time of a packet upstream from the TxMAC 210, however, is difficult. This is because of variations or differences in the amount of latency that may be experienced by a packet transiting between the upstream timestamp location and the transmit logic. These latency variations may be caused by the units or logic which perform operations on the packets as the packets proceeds downstream through the datapath 200. The units that contribute latency to a packet include, for example, the MACSec protection units 206, 208, the TxMAC 210, and the PCS 214.

Figure 3:
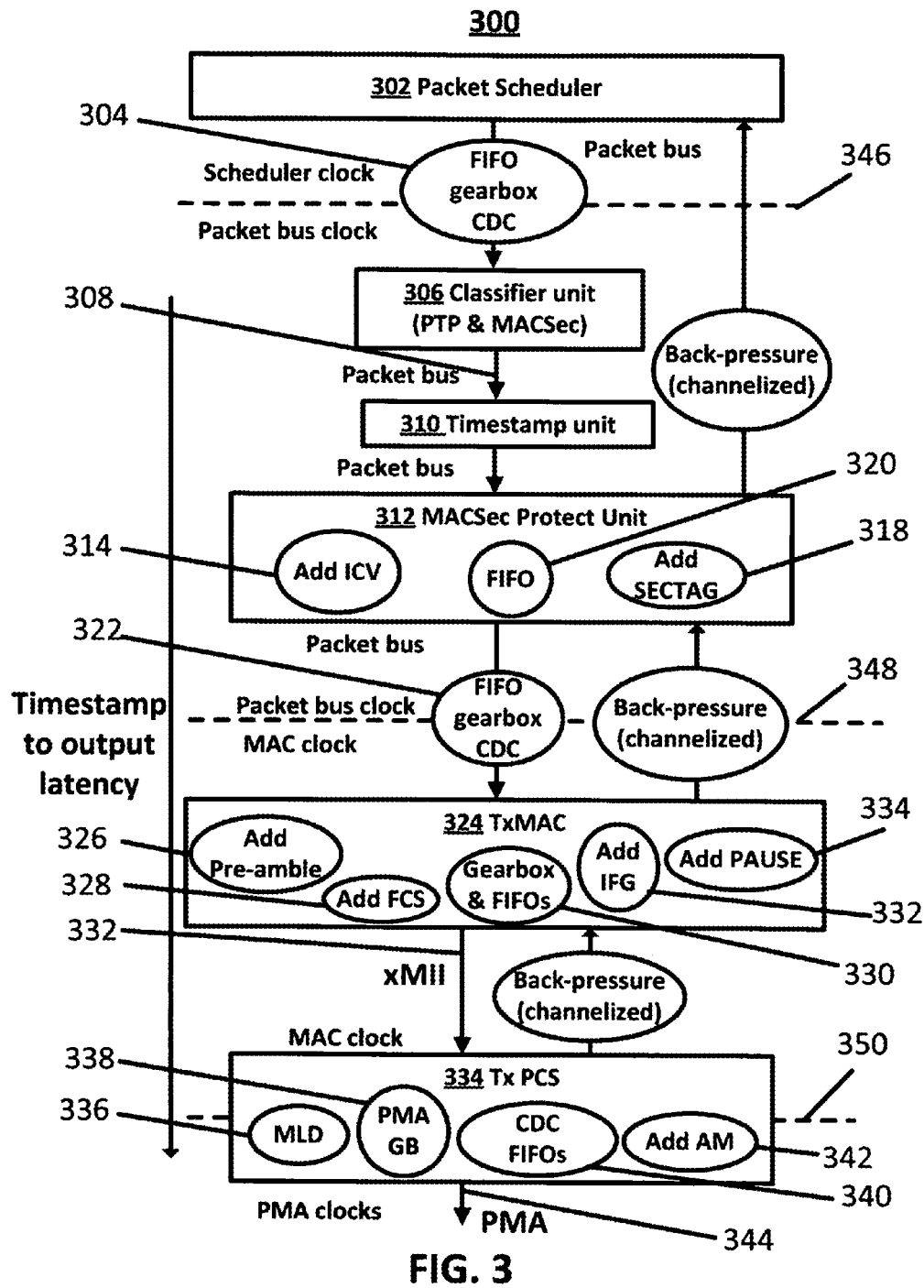
FIG. 3 shows a block diagram representative of a portion of a transmit datapath identifying sources of latency variance.

FIG. 3 shows a block diagram that is representative of a portion of a transmit datapath 300, similar to the transmit datapath 200 represented in FIG. 2A. The datapath 300 shows sources that may contribute latency uncertainty or variance when the timestamp unit 310 is located upstream from the TxMAC 324.

Three principle sources of latency variation in a datapath include the packet bus 308; data insertion in packets at points downstream from the timestamp unit 310; and channelized FIFOs and gearboxes 320, 322, 330, 340 and clock domain crossings 346, 348, 350.

The packet bus 308 may be overclocked and back-pressured. This may result in traffic for each channel being prone to alternating bursts of periods where packet data is present, and is not present. When there are gaps on the packet bus 308 between packets, however, individual packets may be stretched out or compressed in time on the packet bus 308 in unpredictable ways. This is due to bursts of stop/start signals to the logical blocks/units of the packet bus 308 which process the packets. This has an accordion effect on packets in the datapath 300 making the amount of latency difficult to predict. There is also typically unused space remaining in a word of the packet bus 308 after the EOP of a packet because the SOP of the next packet must be located on the MSB of the next word. This amount of unused space varies for each packet and worsens the accordion effect based on the amount of back-pressure in the datapath 300.

Another source of latency variation may be the insertion of data into the datapath 300 downstream from the timestamp unit 310. For example, the MACSec protection unit 312 may insert fields into a packet including the MACSec ICV 314 and SECTag 318 fields, and the TxMAC 324 may insert fields into a packet including the Preamble and Start of Frame Delimiter, Frame Check Sequence, and Inter-Frame Gap fields 332. The latency experienced by a selected packet in the datapath 300 when data is inserted into packets downstream of that selected packet depends on the number of packets downstream. Adding fields to each packet expands the number of bytes per packet so many smaller packets will, collectively, have more bytes inserted than a few larger packets. The more bytes inserted, the greater the latency experienced by a packet at the timestamp unit 310 traveling to the transmit logic. The TxMAC 324 may also create and insert packets into the datapath 300 (for example, PAUSE packets). Any new packets from the TxMAC 324 will, accordingly, affect the latency experienced by the upstream packets.

In a channelized packet bus 308 (such as a time-division-multiplexed (TDM) packet bus), the state of each channel usually does not affect the state of any other channel. The write-to-read latency through a channelized first-in-first-out (FIFO) buffer for crossing clock domains or changing bus widths, however, may be difficult to determine, and may be another source for latency variation.

Figure 4:
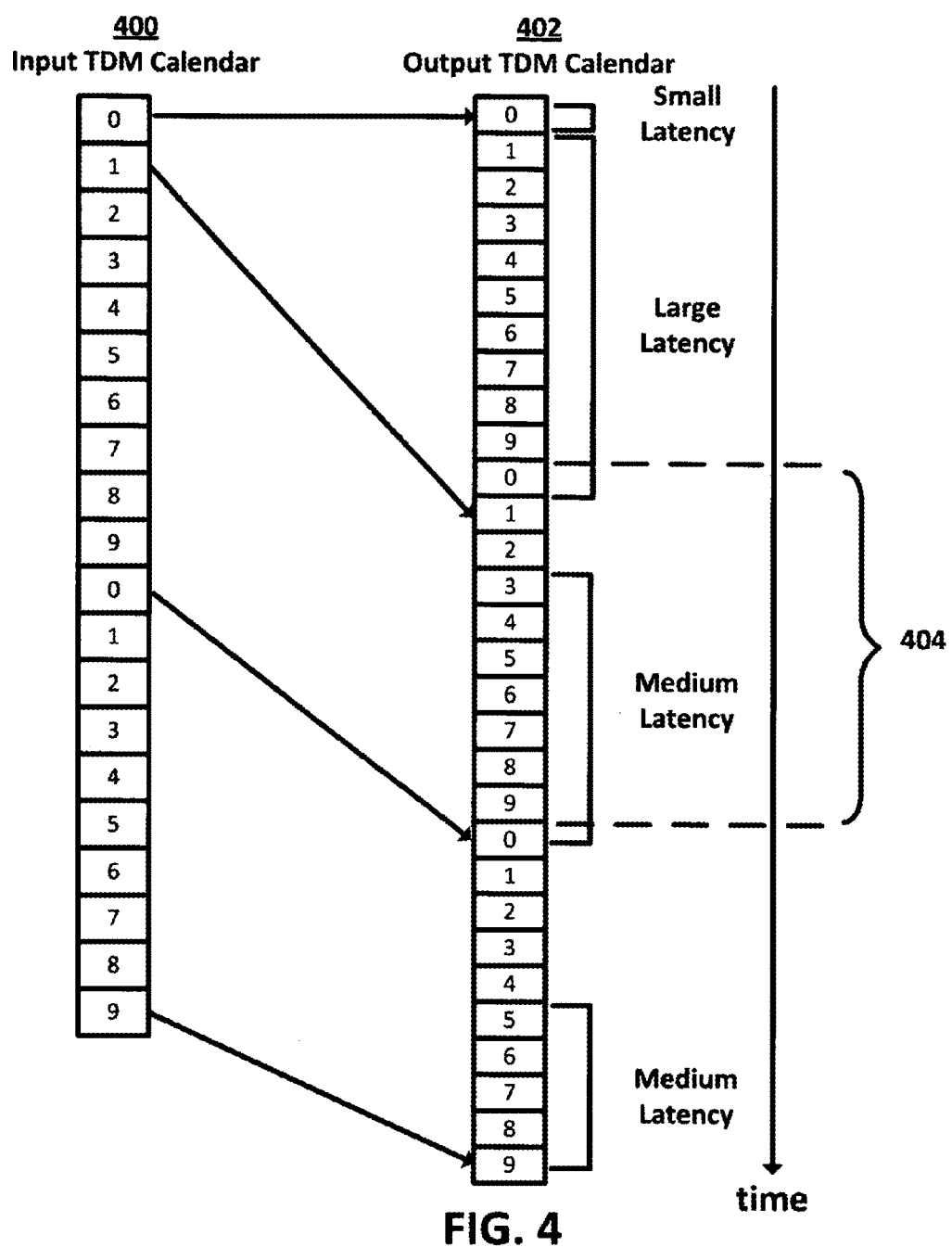
FIG. 4 shows a comparison of input and output packets in a TDM calendar.

FIG. 4 shows a comparison of packets (identified by number) input 400 into a TDM schedule and the location of the corresponding packets output 402 from the TDM calendar 402. When a TDM stream is buffered for each channel and there is no relationship between the input and output TDM schedules, latency may be introduced into the datapath. This often occurs when a TDM stream passes through a gearbox which adjusts bus widths and clock rates. If the TDM buses' rates and widths are not convenient multiples of each other, then the latency uncertainty from the TDM calendar bridging may be as much as one entire output calendar "month" 404.

Due to the number of sources of latency and the amount of latency variation from each of those sources, it is not feasible or practical to deduce the latency to be experienced by any packet within the tolerances required, or attempt to model the latency of each packet. Such deductions and modeling would likely require knowing the exact state of all the downstream logic. The amount of variation in latency depends on the specifics of the architecture, but would likely surpass hundreds of nanoseconds for a 10 GE link, translating directly into timestamp inaccuracy. Such uncertainty in the 1-step transmit timestamp PTP method is generally not acceptable.

United States Patent Application 2012/0163521 to Kirmann et al. teaches 1-step timestamping a PTP packet upstream from a MACSec protection unit. The timestamped PTP packet is delayed in a wait component of the transmitter until the projected departure time arrives, at which point the PTP packet is sent onto the link. Sending of all packets may be disabled or suspended until the timestamped PTP packet is sent. This negatively affects the bandwidth of the transmitter.

United States Patent Application 2013/070797 to Branscomb et al. teaches timestamping a PTP packet upstream from a MACSec protection unit. The timestamped PTP packet and all upstream packets are delayed at the timestamp until the datapath contains no packets and is empty, making the transmit latency more certain. Delaying the PTP packet and all upstream packets, however, negatively affects the bandwidth of the transmitter.

The methods taught by Kirmann and Brascomb both also require assuming a conservative worst-case data path latency, resulting in further bandwidth loss. The methods taught by Kirmann and Brascomb also do not have the ability to tune the projected departure time to the actual data path conditions.

Figure 5:
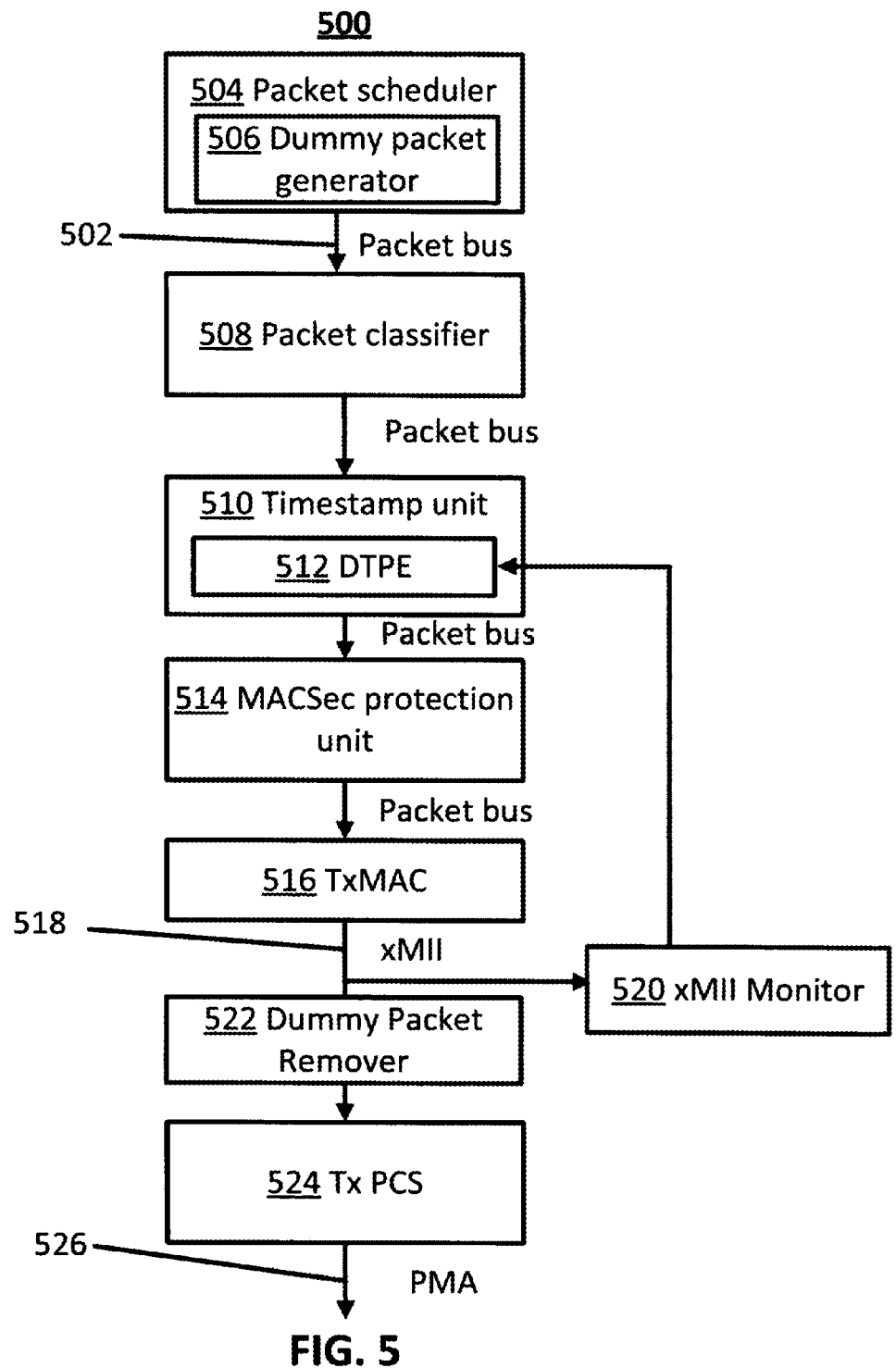
FIG. 5 shows a block diagram representative of a portion of a transmit datapath in accordance with an embodiment of the present disclosure.

FIG. 5 shows a block diagram that is representative of a portion of a transmit datapath 500 of a packet transmitter in accordance with an embodiment of the present disclosure. Although certain functions, features, and methods are described and/or shown as blocks or units in the datapath 500, such functions, features, and methods may be implemented separately or collectively in any number of units, blocks, or logic of a different name.

The datapath 500 comprises a packet bus 502 for transporting packets downstream. The datapath 500 also comprises a packet scheduler 504, a packet classifier 508, a timestamp unit 510, a departure-time prediction engine (DTPE) 512, a MACSec protection unit 514, a TxMAC 516, an xMII 518, an xMII monitor 520, a dummy packet remover 522, a TxPCS 524, and a PMA 526.

The timestamp unit 510 is located in the datapath 500 upstream from the MACSec protection unit 514. The timestamp unit 510 is connected to the MACSec protection unit 514 via a packet bus 502. Generally, the timestamp unit 510 is in communication with the transmit logic via the downstream packet bus 502. The timestamp unit 510 timestamps or embeds a selected packet with a predicted departure time of the selected packet from the transmit logic to a network link (such as an Ethernet network). Since the timestamp unit 510 is upstream from the MACSec protection unit 514, the selected packet is not yet protected at the time the predicted departure time is embedded therein.

In an embodiment in accordance with the present disclosure, the timestamp unit 510 comprises the DTPE 512. The DTPE 512 determines the predicted departure time to the network link of the selected packet based on an actual departure time of a preceding packet, and the lengths of all intervening packets that transited the packet bus 502 between the selected packet and the preceding packet. The intervening packets include all packets that transited the datapath before the selected packet up until the preceding packet, irrespective of whether any of those intervening packets are still in the datapath or had already been transmitted to the link at the time when the predicted departure time is calculated. In an embodiment, the predicted departure time is based on the intervening packets in the packet bus 502 downstream from the selected packet, and all of the packets that had been transmitted to the link after the preceding packet and are no longer in the datapath 500.

In an embodiment, the DTPE 512 determines the predicted departure time based on the total final length of all of the intervening packets by measuring the length of each packet that passes through the packet bus 502, accounting for additional bits that may be added to each packet as it transits downstream the packet bus 502, and determining the amount of latency or duration that the final packet adds to the datapath 500. The final length of a packet is equivalent to the length of the corresponding frame.

To help track packets through the datapath 500, the DTPE 512 may assign an index number to every packet that passes through the timestamp unit. The index number may be inserted into the packet, or sent in a side-line to the packet bus 502.

The xMII monitor 520 observes the xMII and captures or records the actual departure times of packets from the TxMAC 516. The xMII monitor 520 also provides the actual departure times and index numbers of packets to the DTPE 512 for use in calculating the predicted departure times of upstream packets. In an embodiment a standard, off-the-shelf, xMII and TxMAC are used.

For the DTPE 512 to determine the predicted departure time of a packet with an acceptable level of accuracy, the packet bus 502 must be continuously full of packets such that there is, ultimately, a predictable inter-frame gap (IFG) between adjacent packets between the DTPE 512 and the xMII 518. For predictable IFGs, the packet bus 502 (which includes all segments of the packet bus 502 between the timestamp unit 510 and the TxMAC 516) must be continuously full of packets during the period of time commencing at the departure time of the preceding packet, and up until the time when the predicted departure time of the selected packet is determined. The packet bus 502 needs to be continuously filled with packets during this period of time since whatever transmit bandwidth is not filled by frames will ultimately be filled by inter-frame-gap (idles) whose duration is hard to predict for all the reasons identified above. Once the packet bus 502 is full of packets, however, the TxMAC 516 will only insert the smallest allowable gap between the corresponding frames on the transmit link. That smallest allowable gap is deterministic, helping the frame-to-frame duration be similarly predictable.

The dummy packet generator 506 helps keep the packet bus 502 continuously full of packets by inserting dummy packets into the packet bus 502 when the packet bus 502 would otherwise have not been full. The dummy packet generator 506 may determine that the packet bus 502 would not be full based on a packet not being available from an upstream buffer supplying the packet scheduler 504. All dummy packets flow through the majority of the datapath 500 like all other packets. The dummy packet generator 506 may also add TxMAC-generated packets (such as PAUSE frames) to the datapath 500 as further described below. The dummy packet generator 506 may form part of the packet scheduler 504 or may be a separate logical block or unit connected to the packet bus 502. The intervening packets may comprise dummy packets.

The dummy packet remover 522 identifies dummy packets that were added by the dummy packet generator 506 to the packet bus 502, and replaces those dummy packets with idle characters. The addition of dummy packets to the datapath 500 does not result in bandwidth loss, generally. This is because dummy packets merely occupy the space that would have otherwise been occupied by the idle cycles between adjacent packets in the datapath 500. The total inter-frame-gap between a plurality of packets (after replacing the dummy packet) would be the same if dummy packets had never been inserted in the first place. Dummy packets effectively re-arrange the spacing of frames and gaps on the xMII such that each inter-frame gap is deterministic and each frame-to-frame delay becomes predictable.

If the preamble of a packet was embedded with the packet's index number by the timestamp unit, the preamble must be replaced with a standard preamble before exiting the transmit logic. In an embodiment, the preamble replacement may be done by the dummy packet remover 522.

In accordance with an embodiment of the present disclosure, a predicted departure time ($DT_n$) of a selected packet may be calculated according to the following formula:

$$DT_n = DT_{n-1} + \frac{LEN_{n-1} + IFG_{n-1}}{x},$$

where
$DT_{n-1}$ is the departure time (actual or predicted) of a packet immediately downstream or preceding the selected packet;
$LEN_{n-1}$ is the final length of the immediately preceding packet;
$IFG_{n-1}$ is the inter-frame gap between the selected packet and the immediately preceding packet; and
x is the data transfer rate of the link.

By recursively applying the preceding formula, the departure time ($DT_n$) of a selected packet may also be predicted based on the actual departure of any preceding packet. The predicted departure time of a selected packet ($DT_n$) is based on an actual departure time of a packet k frames ago ($DT_{n-k}$) according to the following:

$$DT_n = DT_{n-k} + \sum_{i=n-k}^{n-1} \left( \frac{LEN_i + IFG_i}{x} \right)$$

To be clear, even if a predicted departure time of a selected packet is based on a previously predicted departure time of a previously selected packet, ultimately the predicted departure times is based on an actual departure time of a transmitted packet.

According to this formula, the departure time of a selected packet can be predicted based on a preceding packet's actual departure time k packets ago, and the lengths of all of the intervening packets, so long as there is a predictable IFG between all of the intervening packets. In an embodiment, the actual departure time of a packet is fed back from the xMII. Once an actual departure time of a packet is observed, the predicted departure times of subsequent packets may be determined based on the actual departure time.

The intervening packets are all of the packets that transit the packet bus after the preceding packet and before the selected packet. Accordingly, intervening packets may include packets that have since been transmitted to the link. Intervening packets may also include dummy packets that are inserted into the packet bus 502 because without such packets the packet bus 502 would not be full. As further described below, for there to be a predictable IFG between intervening packets on the link, the packet bus from at least downstream of the timestamp unit 510 must always be full of intervening packets.

The length of a packet and the latency of that packet are inter-changeable since the latency delay caused by a single packet is the length of that packet divided by the known transmit data communication rate on the interface. For example, the rate of a 10 GE link is 10 Gigabits per second, or 1.25 Gigabytes per second. As such, a 468-byte packet with a 12-byte inter-frame gap will have a duration of 384 nanoseconds on the 10 GE interface.

The following table shows the predicted departure times for 5 consecutive packets (packets 0 to 4) according to the above-noted formulas over a 10 GE link in accordance with an embodiment of the present disclosure. The lengths of each packet in the following table were selected at random for illustration purposes, only. For a 10 GE channel, every start-of-packet is 4-byte aligned, so the packet length plus the inter-frame gap will always be a multiple of 4 bytes. Each 4 bytes takes 3.2 nanoseconds to transmit on the medium.

| Packet | Calculated Departure Time | Packet Length (including IFG) | |
|---|---|---|---|
| | | Bytes | Bytes/4 |
| 0 | $T_0$ | 84 | 21 |
| 1 | $T_1 = T_0 + 21 * 3.2$ ns | 1516 | 379 |
| 2 | $T_2 = T_1 + 379 * 3.2$ ns | 352 | 88 |
| 3 | $T_3 = T_2 + 88 * 3.2$ ns | 880 | 220 |
| 4 | $T_4 = T_3 + 220 * 3.2$ ns $T_4 = T_0 + (21 + 379 + 88 + 220) * 3.2$ ns $T_4 = T_0 + 2265.6$ ns | ... | ... |

In accordance with an embodiment of the present disclosure, the DTPE calculates the departure time for all packets, but only modifies the contents of PTP packets by 1-step timestamping.

The method for calculating the departure time and timestamping a PTP packet does not incur any bandwidth penalty since it does not delay the transit of packets, or insert any additional delay, in the datapath. The flow of packets is unmodified by calculating the predicted departure times and the timestamp operation.

FIG. 6A shows a representation of a portion of a packet bus 600 having a word width of 16 bits. The packet bus 600 has 4 packets, namely, packet 1 610, packet 2 620, packet 3 630, and packet 4 640 stored thereon. Each packet 610, 620, 630, 640 beginning at the MSB 602 of the packet bus word and commencing with a SOP bit. Each packet also has an EOP bit which may reside anywhere within the packet bus word up until the least significant bit location (LSB) 604. For example, the EOP of packet 1 610 is 7 bits from the MSB location. The series of bits in the packet bus word after the EOP of each packet (if any), and up until the least significant bit (LSB) position of the word are not part of the packets, and represent the inter-frame gaps between the packets. Inter-frame gap A 650 is the inter-frame gap between packet 1 610 and packet 2 620. There is no inter-frame gap between packets 2 620 and 4 630. Inter-frame gap B 652 is the inter-frame gap between packet 3 630 and packet 4 640. The inter-frame gaps shown are the result of the SOP byte of each packet needing to be aligned with the MSB of the packet bus word rather than commencing immediately after the EOP of the preceding packet.

FIG. 6B shows a representation of a portion of a serial bus 660 storing serialized packets 610, 620, 630, and 640 thereon. Since the packets are back-to-back on the packet bus 600, the packets are also back-to-back on the serial bus 660, subject to a small inter-frame gap, preamble bits, and frame check sequence bits inserted by the TxMAC.

In accordance with an embodiment of the present disclosure, the packet bus must be full of packets from the actual time of departure of a preceding packet and the time at when the predicted departure time is embedded into the selected packet. The only cycles that do not carry packet data are cycles which are caused by back-pressure from downstream blocks or logical units. Ensuring that the packet bus is full of packets during the relevant time minimizes the inter-frame gap, thus making it predictable.

The conventional packet bus may not, by normal operation, be full unless the link is over-subscribed. Indeed, a network device may have periods of reduced activity wherein less than 100% of the bandwidth is used. In accordance with an embodiment of the present disclosure, when the packet bus would not be full of packets downstream from the timestamp unit 510, dummy packets are inserted. In an embodiment, a packet bus is not full when, in the absence of back-pressure from the downstream blocks, at least one full word of the packet bus does not contain any portion of a packet.

Figure 7A:
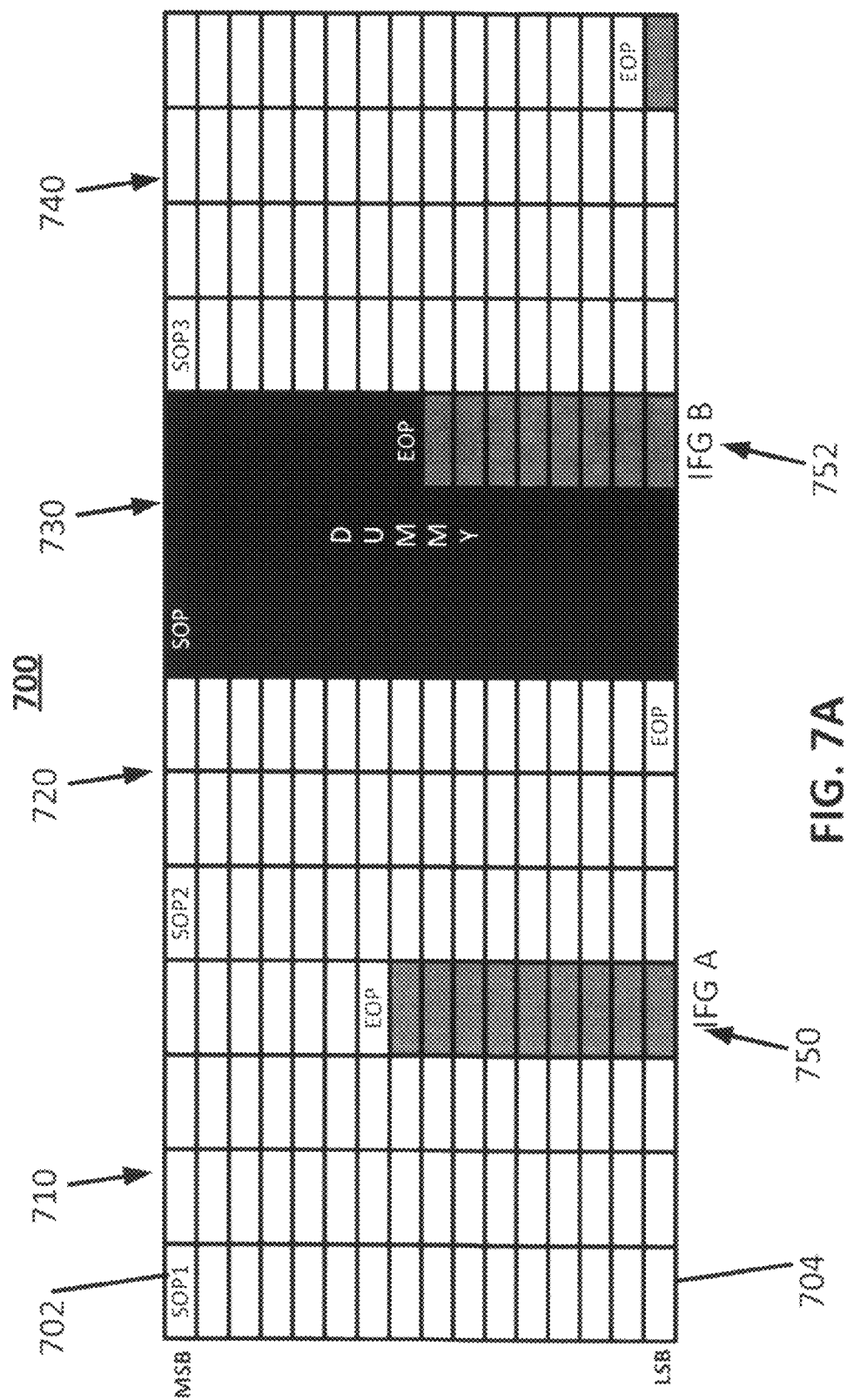
FIG. 7A shows a representation of a portion of a packet bus comprising a dummy frame.

FIG. 7A shows a representation of a portion of a packet bus 700 which is essentially the same as the packet bus 600 of FIG. 6A, the difference being that a dummy packet 730 has been inserted on the packet bus 700 between packet 2 720 and packet 3 740. The dummy packet 730 was inserted because, without such packet, at least one full word of the packet bus would not have contained any portion of a packet. The packets (including the dummy packet) are considered to be "back-to-back" on the packet bus 700 because all words contain at least a portion of a packet.

Dummy packets can transit through the timestamp unit 510, the MACSec protection unit 514, and the TxMAC 516 just like other packets. The timestamp unit 510 does not distinguish between real and dummy packets. The timestamp unit 510 calculates the departure time of a selected packet or dummy packet as it would any other packet. The TxMAC frames dummy packets with preambles and, in certain cases, embeds with a frame check sequence adder. Dummy packets will also have inter-frame gaps inserted thereafter similar to all other packets.

Figure 7B:
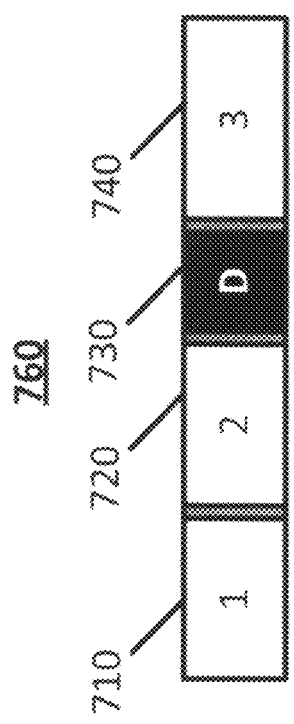
FIG. 7B shows a representation of a portion of a serial bus storing serialized packets including the dummy packet.

FIG. 7B shows a representation of a portion of a serial bus 760 at the xMII storing the four serialized packets 710, 720, 730, 740, including the dummy packet 730.

In accordance with an embodiment of the present disclosure, a dummy packet remover 522, downstream from the TxMAC 516, (on the xMII 518), detects the presence of a dummy packet and replaces it with an inter-frame gap (idle characters). This ensures that the departure time of the next packet after the dummy packet is unaffected by the presence of the (replaced) dummy packet.

Figure 7C:
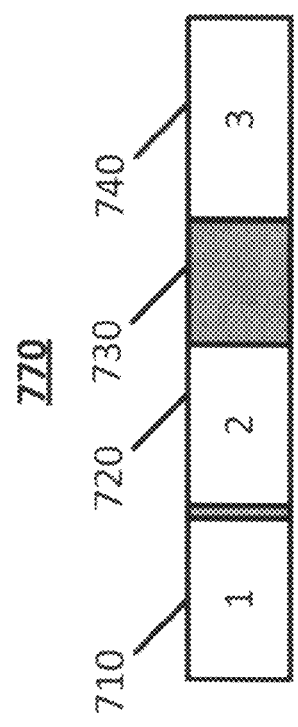
FIG. 7C shows a representation of a portion of a serial bus of FIG. 7B, but removing the dummy packet.

FIG. 7C shows a representation of a portion of a serial bus 770, after the dummy packet remover 522, storing the three serialized packets 710, 720, and 740. Dummy packet 730 has been removed by the dummy packet remover 522.

The dummy packets inserted at an upstream location can, generally, be of any length. The length has no impact on the downstream logic where they are viewed and treated as regular packets. Notwithstanding the foregoing, dummy packets should not be too short or too long since this would cause padding or truncation, respectively, in the TxMAC 516. Furthermore, since dummy packet generation must cease as soon as real packets are available, the dummy packets should be short enough such that they do not occupy any more bandwidth than needed (though not so short as to be padded to the minimum packet length by the TxMAC 516).

The addition of dummy packets leads to no more than a de minimis bandwidth loss on the transmit datapath. Since dummy packets are only generated when there is no packet ready to be transited, the overall utilization of the link is unaffected by the presence of dummy frames: the link would have been idle anyways.

In the unlikely event that a dummy packets is added just as a new, "real" packet becomes available in the upstream buffer, the dummy packets may slightly reduce the maximum achievable bandwidth. This is because the dummy packets may be larger than the natural gap that would have occurred. The reduction from the bandwidth from such an occurrence is very small and limited to that occurrence. Insertion of the dummy packets would effectively back-pressure the upstream buffer, causing a temporary build up in buffered packets. Until this build-up dissipates (i.e. until there is no more packet data to be sent from the upstream buffer) no further dummy packets will be generated. Therefore, there is not a long-term, regular, sustained loss of bandwidth from dummy packet insertion.

Figure 8:
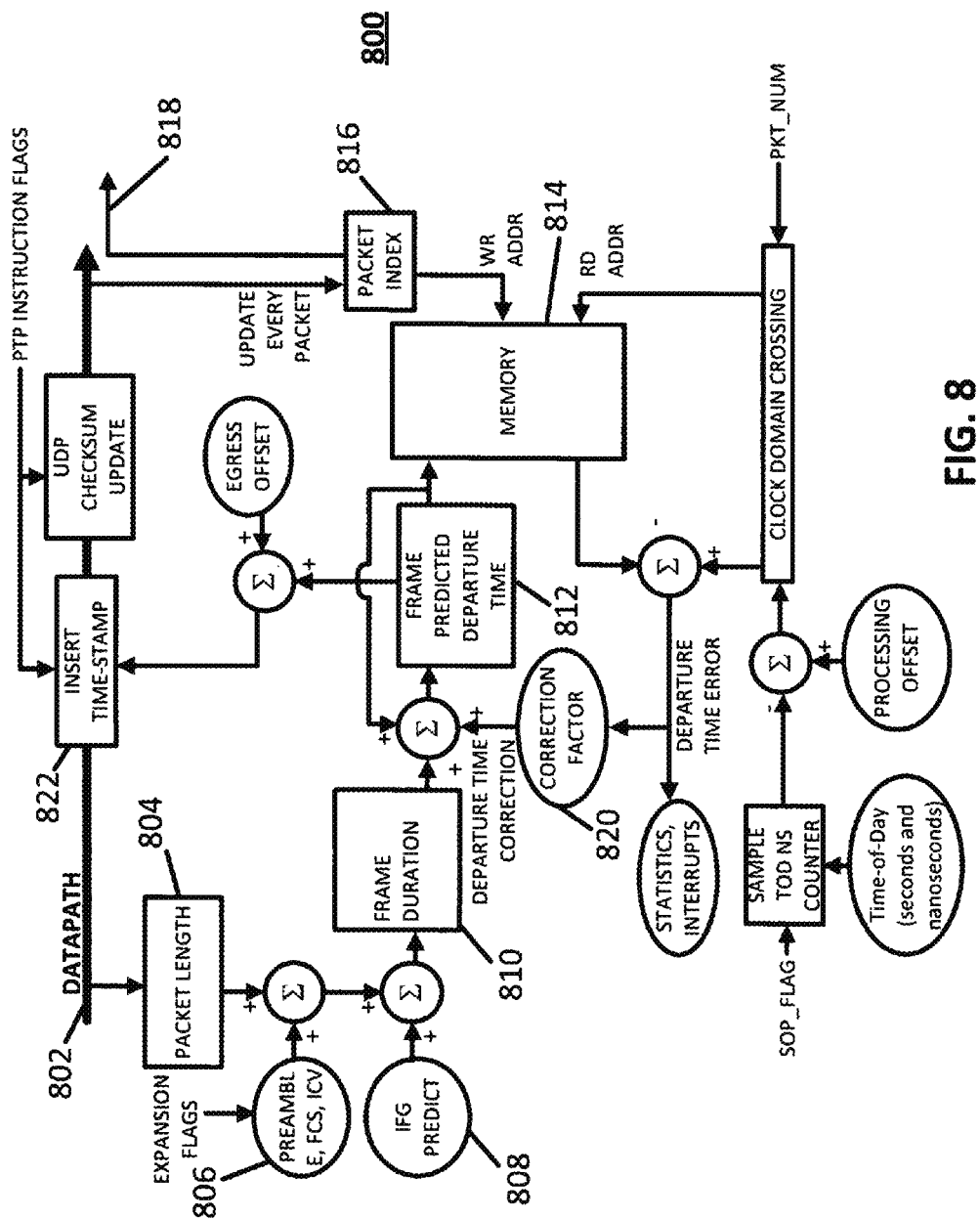
FIG. 8 shows a block diagram representing certain aspects and functionality of a departure-time prediction engine in accordance with an embodiment of the present disclosure.

FIG. 8 shows a block diagram representing certain aspects and functionality of a departure-time prediction engine (DTPE) 800 in accordance with an embodiment of the present disclosure.

The DTPE 800 determines the future frame distance (in bytes) between a current packet and an adjacent downstream packet (from SOP to SOP) on the datapath 802. This is accomplished by detecting the length 804 of the current packet as it passes through the datapath 802, and adding all downstream expansions (such as preamble/SFD, ICV, SEC-Tag, FCS) that each packet will individually experience based on the expansion flags 806 for that packet, and a predicted inter-frame gap 808 for the packet. The distance between adjacent frames (in bytes) is converted into a frame duration 810 in nanoseconds based on the speed of the link.

The frame's predicted departure time 812 is determined by summing the current frame duration 810 with the preceding frame's predicted departure time and the correction factor 820, if any. The current frame's predicted departure time 812 is saved in a memory 814 along with the corresponding index 816 of the current packet that was inserted by the timestamper into the current packet.

If the current packet is a PTP packet, the current frame's predicted departure time 812 is inserted as a timestamp 822 into the current packet (adjusting for the xMII to device output latency). The packet index 816 is assigned to the current packet by sending the packet index 816 along the datapath 802 as a side-band signal 818.

In an embodiment of the present disclosure, the actual departure time of a packet is incorporated as an SFD flag on the xMII clock. When receiving the SFD flag, the Time-of-Day can be sampled, and transferred to the datapath clock domain (taking any sampling process latency into account). The actual departure time and predicted departure time are compared after retrieving the predicted departure time of the frame from the memory 814. Statistics are gathered on the departure time accuracy, and interrupts can be triggered if the actual vs predicted departure time shows a large error. Future predicted departure times may be adjusted based on the difference between the predicted departure times and actual departure times. The correction of differences between the predicted departure times and actual departure times of packets may be performed in a number of manners as further described below.

The length of inter-frame gaps is regulated by a Deficit-Idle-Counter (DIC). Although the DIC helps ensure a selected average inter-frame gap length (e.g. 12 bytes) over a series of frames, the length of each individual inter-frame gap can vary depending, in part, on the frame lengths and where the EOP falls within the bus word. For a 10 GE link, for example, the inter-frame gap will generally be within the range of 9 and 15 bytes in order to maintain a selected average IFG length of 12 bytes across a series of frames. In certain cases, the IFG will be significantly smaller than the average. For example, when a device acts as a retimer the IFG may be as low as 5 bytes (for a 10 GE link) if the local clock reference is slower than the clock from the original traffic source.

Knowing the actual length of each inter-frame gap rather than the average length can help improve the accuracy of the predicted departure time to the actual departure time. For example, if the DTPE assumes each IFG is 12 bytes, each frame's predicted departure time may be off by +1-3 bytes if the actual IFG is between 9 and 15 bytes.

In accordance with embodiments of the present disclosure, there are several ways for a DTPE to predict the inter-frame gap that will be inserted after each frame, that is more accurate than using the average inter-frame gap.

In an embodiment, the DIC state is mirrored in the DTPE based on observing the IFG generated by the DIC in the TxMAC. The observation may be performed by the xMII monitor 520 as part of monitoring the actual departure time of a packet. The IFG is visible from the actual departure time measurement. The DTPE infers the state of the DIC in the TxMAC based on the observed IFG, and predicts the IFG after every frame. In other words, the DTPE essentially observers the length of upstream packets and predicts what IFG the DIC will provide after each packet based on the requirement that the DIC must maintain a particular average IFG. The DIC logic is effectively implemented in the DTPE except that the DTPE doesn't actually implement the IFG. With this method, the IFG may be predicted to the accuracy of a byte.

In another embodiment in accordance with the present disclosure, the state of the DIC is reported directly to the DTPE. In this way, the DTPE knows what IFGs provided by the DIC. For example, the state of the DIC may be the running difference from the average IFG length. The DIC will behave so as to keep the running difference as close to 0 as possible. For example, if the state says "−2" and the next IFG can either be 10 or 14 (in the case of a packet on a 10 GE link whose length divided by 4 has a remainder of 2 bytes, then the next IFG would be 14, based on the fact that the previous running remainder is negative. After that IFG, the running remainder would be 0. The DIC may also compensate for alignment markers. For a 100 GE link, the DIC is "biased" such that the total IFG is 160 bytes less over a window of 2.6 M bytes.

Some implementations of a TxMAC may allow for the IFG to be specified outside the TxMAC itself via a control signal on the packet bus. In another embodiment, the DIC is located in the timestamp unit upstream from the TxMAC so that the DTPE has direct control over the IFG. In this embodiment, the DTPE uses actual and not predicted IFG lengths in determining the predicted departure times of packets.

Conventional TxMACs collect statistics that can be used to monitor network activity and quality. Those statistics may include the number of packets sent without error, total number of frames sent, and total number of bytes sent (excluding preamble and inter-frame gap). In accordance with an embodiment of the present disclosure, the statistics are altered in the software/firmware by the dummy packet generator 506. The dummy packet generator tracks the number of dummy frames sent on to the packet bus, and makes that information available to the software. The software may adjust the statistics gathered from the TxMAC to account for the number of dummy frames that have been generated over the monitoring period.

In another embodiment, the TxMAC is configured to ignore dummy packets when determining statistics. A flag is raised at the input to the TxMAC input to indicate that a packet is a dummy packet and should be excluded by the TxMAC from the statistics. This makes the software less complicated at the cost of making the hardware more complicated.

The actual departure times of packets may be observed and used in determining the predicted departure times of subsequent upstream packets. Actual departure times also provide a closed loop system which may be used to correct or adjust the accuracy of subsequent predicted departure times. If a selected packet's length (or the length of the inter-frame-gap) is miscalculated, for example, the resulting timestamp inaccuracy will only impact the selected packet and potentially some upstream packets. Once the actual departure time of the selected packet is known, however, the difference between the actual and predicted departure times can be used to correct the departure times of upstream packets that are subsequent to the selected packet. Where the selected packet is being timestamped, the predicted departure time of the selected packet may be corrected or adjusted based on a preceding actual departure time and a preceding predicted departure time of one of the intervening packets.

The correcting functionality may also be helpful when first starting up the transmit datapath since the predicted departure time may begin with an un-tuned initial value. The feedback of actual versus predicted departure times, accordingly, helps the predicted and actual departure times of subsequent packets to converge. The closed-loop system thus helps avoid manually tuning the predicted departure times.

There may be a delay between correcting a selected packets predicted departure time, and observing the effect of this correction or adjustment in the predicted versus actual departure times of that selected patent. This is because the selected packet may need time to transit the datapath from the timestamp unit to the transmit logic. For example, if a selected packet's departure time prediction has a static error of 100 ns, then all of the packets in the transmit datapath have the same error. Only upon the packet, for which the correction to the error has been applied, has made it to the location where actual departure times are measured, would the error be expected to disappear.

There are a number of ways to use measured actual departure times to better predict, or correct errors in, the departure times of upstream packets. The examples described herein are not exhaustive. Generally, there is a trade-off between the implementation simplicity of the method to correct predicted departure times, and the speed at which the departure times are corrected. Certain methods of correcting predicted departure times may be better suited to different kinds of predicted-vs-actual departure time errors. Low-frequency or static errors are simpler to identify and correct as compared to high-frequency error.

In an embodiment of the present disclosure, a correction factor is periodically applied to the predicted departure times of packets. The correction factor may be applied as an offset to the predicted departure times. The correction factor is the difference between the actual departure time and predicted departure time (also referred to as the predicted departure time error) for the packet of the most recently received actual departure time. Once a correction factor is applied to the predicted departure time of a selected packet, a defined period of time is allowed to lapse to permit the selected packet to transit the datapath from the timestamp unit to the xMII or the location where the actual departure time is measured. In an embodiment, the delay between identifying predicted departure time errors and actually correcting those errors is at least the amount of time required for a packet to transit the datapath from the timestamp unit to the location where the actual departure times are measured (e.g. xMII). Accordingly, corrections may only be made on a periodic basis.

Generally, a correction to the predicted departure times may be applied after every N packets, where N is equal to or larger than the maximum possible number of packets between the timestamp unit and the xMII. Since packet sizes vary, the amount of time between the corrections will vary.

Corrections made more frequently than N packets in accordance with this embodiment of the present disclosure may overcompensate for predicted departure time errors. Although less complex to implement, this method may not be well suited for correcting predicted departure time errors that occur at a high-frequency.

In another embodiment of the present disclosure, a correction factor is continuously applied to the predicted departure times of packets. The correction factor is the difference between the predicted departure time errors for the packets of the two most recently received actual departure times. Adjusting the correction factor by an amount based only on the difference in errors (rather than the full errors, themselves) avoids correcting the same error more than once. In an embodiment, a memory stores the correction factor that has been applied to the predicted departure time of each packet. This helps avoid over compensating for predicted departure time errors such that the error correction for a selected packet appears as new errors at the time it is transmitted. Although this method may quickly compensate for errors, it may also be more sensitive to high-frequency errors.

In another embodiment of the present disclosure, a correction factor is continuously applied to the predicted departure times of packets. The correction factor is a portion of the difference between the predicted departure time errors for the N most recently received actual departure times. In other words, a filter is used to more gradually apply the difference in errors across multiple packets rather than adjust for the entire difference in errors in each packet. The use of a filter is preferable if any high-frequency error exists on the departure time measurement or prediction. Although this method of error correction is robust, it is also likely the most difficult/costly to implement.

Referring again to FIG. 5, in accordance with an embodiment of the present disclosure, the functionality of the timestamp unit 510, and everything upstream therefrom, may be implemented in software. For example, the packet scheduler 504, the dummy packet generator 506, the packet classifier 508 (for calculating the final lengths of packets), the timestamp unit 510, and the DTPE 512 may be implemented in software that is run on a single hardware element. By implementing this functionality in software, the packet classification parameters and the predicted departure time correction functionality may be changed without needing to change any hardware. A software implementation may require the processor to be sufficiently fast to sustain the maximum bandwidth on the link.

For multi-lane Ethernet interfaces such as 40 GE and 100 GE, data is not transmitted strictly serially on the medium (network link). Rather, 8-byte blocks of data are distributed among multiple Physical Coding Sublayer (PCS) transmit lanes. Each PCS transmit lane transmits its own data block serially, but the lanes transmit the blocks in parallel at the same time. A single multi-lane distribution (MLD) refers to a phase when all transmit lanes transmit their 8-byte blocks of data. Since a packet is larger than 8 bytes, portions of a packet may be distributed among multiple PCS lanes in a single MLD distribution. Packets smaller than N blocks of 8 bytes may be transmitted within a single MLD round-robin distribution. Packet larger than N blocks of 8-byte blocks must be transmitted across multiple MLD round-robin distributions. Within a single MLD distribution, the departure time of each 8-byte block of data is the same. PTP functions may need to account for the additional complexity of a multi-lane Ethernet interface when reporting and calculating the actual and predicted departure times, respectively.

In accordance with an embodiment of the present disclosure, the departure time of a packet is based on the number of PCS transmit lanes and the size of block accepted by each transmit lane. These parameters determine which lane a packet's start-of-frame will land (i.e. the MLD phase), as well as the actual time of departure of the packet. As noted above, the actual time of departure of a packet/frame is the time at which the first bit of the packet is sent by the transmit logic onto the link. Although the time of departure for all N PCS lanes is the same, a packet may be sufficiently long such that it is transmitted through multiple MLD distributions.

For example, consider a 100 GE link comprising 20 PCS lanes, each lane having a rate of 5 Gbps. Distributing and transmitting a full round-robin distribution of 8-byte blocks across the 20 PCS lanes has a duration of 12.8 ns. If, for example, a packet's length (including downstream expansion and inter-frame gap) is 416 bytes, then the "duration" of the packet would be 52 blocks, each block being 8-bytes. Distributing those 52 blocks among 20 PCS lanes would result in two full MLD distributions (20 blocks per distribution), plus a third, partial MLD distribution of 12 blocks representing the remainder of the packet. The following table shows the predicted departure time and the departure lane of the start-of-frame for the packet of this example and four other packets of example lengths selected for illustration purposes.

| Frame | Predicted Departure Time | Estimated Departure Lane of Start-of-Frame | Frame Length bytes | Full MLD dist. | MLD phase remainder |
|---|---|---|---|---|---|
| 0 | $T_0$ | 0 | 416 | 2 | 12 |
| 1 | $T_1 = T_0 + 2 * 12.8$ ns | $(0 + 12)$ mod $20 = 12$ | 776 | 4 | 17 |
| 2 | $T_2 = T_1 + (4 + 1) * 2.8$ ns | $(12 + 17)$ mod $20 = 9$ | 1160 | 7 | 4 |
| 3 | $T_3 = T_2 + 7 * 12.8$ ns | $(9 + 4)$ mod $20 = 13$ | 88 | 0 | 11 |
| 4 | $T_4 = T_3 + (0 + 1) * 12.8$ ns $T_4 = T_0 + (2 + 5 + 7 + 1) * 12.8$ ns $T_4 = T_0 + 192.0$ ns | $(13 + 11)$ mod $20 = 4$ | . . . | . . . | . . . |

In accordance with an embodiment of the present disclosure, a predicted departure time of a selected packet, in a multi-lane interface, is determined based on the estimated departure lane of the first block, and the length, of each of the preceding packets. The method for determining the predicted departure time of a packet is similar to the method for single-lane channels in accordance with an embodiment of the present disclosure, but also including the step of estimating the departure lane of the first block of a packet. Ultimately, the departure lane of the first block of a packet is determined by the lengths of the preceding packets, the number of transmit lanes, and the size of blocks accepted by the transmit lanes.

More generally, any downstream PCS state information (not just the MLD distribution state) made available to the xMII can form part of the actual departure time observation, and information contained within the actual departure time reporting. The state of downstream PCS blocks may be included in the departure time information provided to the DTPE, and incorporated into the predicted timestamps. The reported states can include the MLD distribution state identifying the MLD distribution number on which a portion of a packet was transmitted, the alignment marker insertion state identifying the point in the data stream at which the alignment markers are inserted, the physical medium attachment (PMA) gearbox states, and even the downstream parallel in, serial out (PISO) state. Those states may help increase the accuracy of the predicted departure times for timestamps that are made at both the TxMAC and upstream thereof.

For multi-lane Ethernet interfaces such as 40 GE and 100 GE, (and some single-lane interfaces like 25 GE), alignment markers are inserted in lanes to de-skew the lanes at the far-end. Alignment markers occupy space on a link, however, therefore delaying the sending of packets. Adding the frame-to-frame duration to predicted departure times, however, does not compensate for the contribution of the alignment markers to the latency experienced by a packet. Alignment markers are typically only inserted on a periodic basis. If the position of an alignment marker is known, then the position of the next alignment marker may be determined based on the number of bytes from the first alignment marker. In accordance with an embodiment of the present disclosure, the xMII monitor records alignment marker position indications that are provided to the DTPE. The DTPE calculates the predicated departure times of frames based on the alignment marker position indications.

Referring again to the transmit datapath 500 of FIG. 5, if the TxMAC 516 generates a PAUSE frame, it would delay transmission of all other frames, thereby potentially rendering inaccurate the predicted departure time for each subsequent frame (at least until corrected by the closed-loop mechanism). In accordance with an embodiment of the present disclosure, the TxMAC 516 is prevented from generating PAUSE frames, which are instead generated by the dummy packet generator 506. In an embodiment, the supporting hardware for generating PAUSE frames (configuration, pause refresh timers, etc.) are disabled in the TxMAC 516 and implemented in the dummy packet generator 506. In an embodiment, the dummy packet generator 506 creates and inserts control frames (including PAUSE frames) that would have otherwise been generated by the TxMAC.

If a device receives a PAUSE frame, then it must halt transmission. But halting at the TxMAC 516 would invalidate the predicted departure times of all of the packets currently in transit along the datapath between the timestamp unit 510 and the TxMAC 516. Furthermore, the packet bus 502 must always be full. In accordance with another embodiment of the present disclosure, dummy frames are inserted into the transmit datapath in response to receiving a PAUSE frame. All dummy packets are replaced with idle characters at the xMII. Notwithstanding that dummy packets are being inserted, the departure time prediction engine continues predicting departure times for each of those dummy packets. During a PAUSE frame, data transmission is stopped. No more packet traffic is sent. Within the datapath, however, a continuous stream of dummy packets are generated at the dummy packet generator 506, then replaced with idles at the TxMAC 516.

Figure 9:
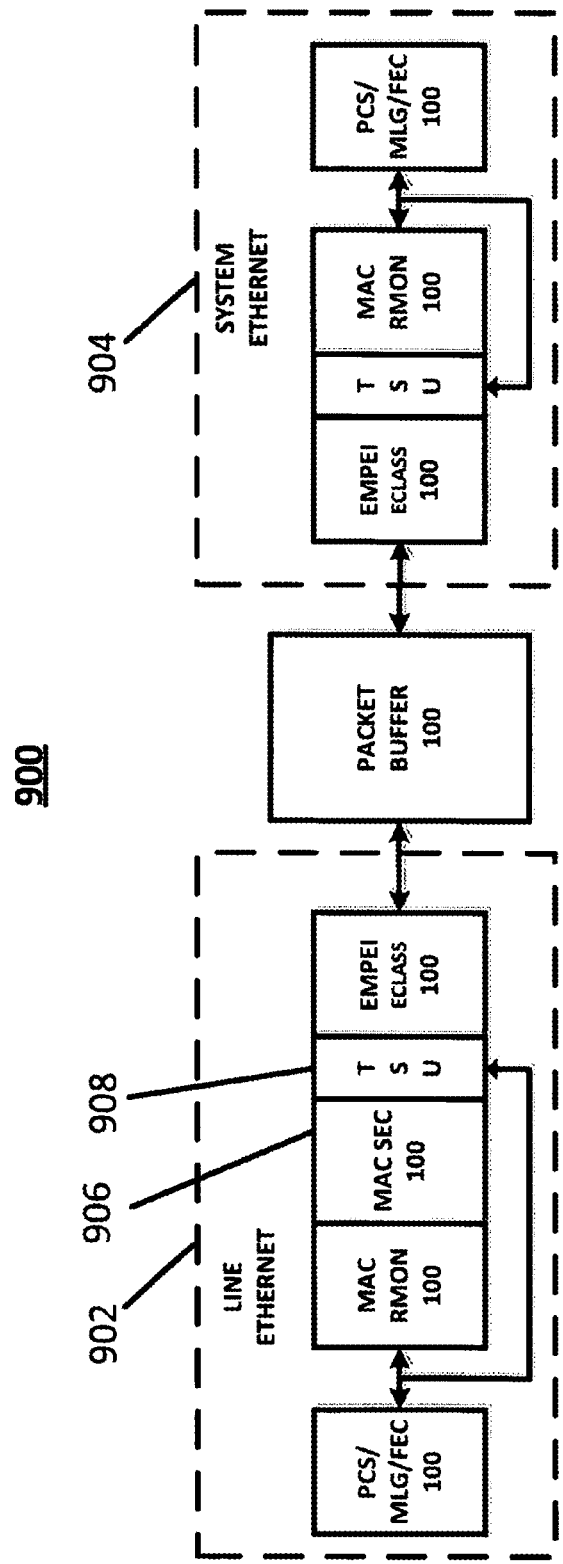
FIG. 9 shows a block diagram representative of an Ethernet portion of a transport device in accordance with an embodiment of the present disclosure.

FIG. 9 shows a block diagram representative of an Ethernet portion of a transport device 1000 in accordance with an embodiment of the present disclosure. The device comprises a line Ethernet interface (line Ethernet) 902 and a system Ethernet interface (system Ethernet) 904. Each Ser-Des runs in 10G or 25G modes, and can therefore support 10 GE and 100 GE interfaces. The line Ethernet 902 comprises a MACSec protection unit 906. The system Ethernet 904 does not comprise a MACSec protection unit. In an embodiment, the line Ethernet 902 may not comprise a MACSec protection unit.

The line Ethernet 902 and system Ethernet 904 may both simultaneously carry PTP messages/packets. Accordingly, the device 900 functions as a PTP transparent clock and corrects for the residence time of the PTP messages in transit through the device 900. The residence time is equal to the departure time of the PTP message at its egress, less the arrival at the receiving device's input. Preferably, the PTP messages are 1-step timestamped to minimize the load on software.

The device 900 comprises 5 identical Ethernet slices, each slice being a channelized TDM packet bus capable of handling 100 gigabits per second (G) of traffic, which is equivalent to ten 10 GE channels, or a single 100 GE channel. The packet scheduler, packet classifier, timestamp unit, MACSec protection unit, and TxMAC all operate in a TDM format. Each slice therefore has 10 logical datapaths, but only one physical datapath.

The line Ethernet 902 supports both MACSec protection and PTP 1-step transmit timestamping. Accordingly, the timestamp unit 1008 is upstream from the MACSec protection unit 1006. Actual departure times of packets are fed back to the timestamp unit 1008 from the xMII for the line Ethernet 902. The timestamp unit 908 determines a predicted departure time for each packet in transit, and uses the predicted departure times to determine the predicted departure time and timestamp PTP 1-step packets.

Although the system Ethernet 904 does not comprise a MACSec protection unit, the system Ethernet 904 implements a PTP transmit 1-step timestamp unit in accordance with an embodiment of the present disclosure. This is so that the hardware of the system Ethernet 904 (scheduler, timestamp unit, TxMAC) is identical to that used on the line Ethernet 902. An Ethernet design that can be used in several contexts may help reduce design and development costs. Although the latency experienced by a packet traversing the system Ethernet 1004 would be different than the latency experienced traversing the line Ethernet 1002, the manner in which the predicted departure times of packets is determined (including the closed-loop feedback mechanism to help self-correct the accuracy of predicted departure times) would the same for both the line Ethernet 1002 and the system Ethernet 1004.

In the preceding description, for purposes of explanation, numerous details are set forth in order to provide a thorough understanding of the embodiments of the disclosure. However, it will be apparent to one skilled in the art that these specific details are not required. In other instances, well-known electrical structures and circuits are shown in block diagram form.

The above-described embodiments are intended to be examples only. Alterations, modifications, and variations may be effected to the particular embodiments by those of skill in the art without departing from the scope, which is defined solely by the claims appended hereto.

I claim:

1. A packet transmitter, comprising:
   a packet bus;
   a timestamp unit located along the packet bus upstream from a transmit media access controller (TxMAC), the timestamp unit configured to embed in a selected packet, while said selected packet transits the packet bus, a predicted departure time to a network link of the selected packet; and a departure time prediction engine (DTPE) in communication with the timestamp unit, the DTPE configured to measure a length of each packet that passes through the packet bus, and determine the predicted departure time of the selected packet based on an actual departure time of a preceding packet to the network link and lengths of all intervening packets that transited the packet bus between the selected packet and the preceding packet when there is a smallest allowable inter-frame-gap between each of the intervening packets since the actual departure time of the preceding packet.

2. The packet transmitter of claim 1, further comprising an xMII monitor in communication with the DTPE, the xMII monitor configured determine the actual departure time to the network link of the preceding packet.

3. The packet transmitter of claim 1, wherein the selected packet is a Precision Time Protocol (PTP) packet.

4. The packet transmitter of claim 1, wherein the DTPE is further configured to determine the predicted departure time of the selected packet based on inter-frame gaps between the intervening packets, the DTPE configured to determine the inter-frame gap between two intervening packets based on the inter-frame gaps of preceding intervening packets.

5. The packet transmitter of claim 1, further comprising a packet protection unit in communication with the packet bus, the packet protection unit downstream from the timestamp unit, the packet protection unit configured to protect the selected packet.

6. The packet transmitter of claim 5, wherein the packet protection unit is a MAC security protection unit.

7. The packet transmitter of claim 1, further comprising a dummy packet generator in communication with the packet bus, the dummy packet generator configured to add dummy packets to the packet bus to help ensure that the packet bus is full of packets downstream from the timestamp unit.

8. The packet transmitter of claim 7, wherein the dummy packet generator is configured to add dummy packets to the packet bus in response to a PAUSE signal.

9. The packet transmitter of claim 1, wherein the DTPE is configured to correct the predicted departure time of the selected packet based on a preceding actual departure time and a preceding predicted departure time of one of the intervening packets.

10. A method for timestamping a selected packet with a predicted departure time to a network link of the selected packet, comprising:
   determining an actual departure time of a preceding packet to the network link;
   determining lengths of all intervening packets between the selected packet and the preceding packet;
   determining the predicted departure time of the selected packet based on the actual departure time of the preceding packet to the network link and the lengths of the intervening packets, and in response to minimal inter-frame gaps after the intervening packets; and
   timestamping the selected packet, along a packet bus, with the predicted departure time, wherein the timestamping occurs upstream from a transmit media access controller (TxMAC) while the selected packet transits the packet bus.

11. The method of claim 10, further comprising adding dummy packets into the packet bus to minimize the inter-frame gaps between the intervening packets.

12. The method of claim 10, further comprising determining inter-frame gaps after the intervening packets.

13. The method of claim 10, further comprising protecting the selected packet after timestamping the selected packet with the predicted departure time.

14. The method of claim 11, further comprising removing the dummy packets after the packet bus.

15. The method of claim 10, further comprising correcting the predicted departure time of the selected packet based on a subsequent actual departure time and a subsequent predicted departure time of one of the intervening packets.

16. The method of claim 10, wherein determining the predicted departure time comprises determining a departure lane, from a plurality of transmit lanes, for a first block of the selected packet.

17. The method of claim 10, further comprising adding dummy packets to the packet bus in response to detecting a PAUSE signal.

18. The method of claim 10, further comprising correcting the predicted departure time based on the difference between two predicted departure time errors.

19. A computer-readable medium storing statements and instructions for execution by a processor to perform steps, comprising:
   determining an actual departure time of a preceding packet to a network link;
   determining lengths of all intervening packets between a selected packet and the preceding packet;
   determining a predicted departure time to the network link of the selected packet based on the actual departure time of the preceding packet and the lengths of the intervening packets, and in response to minimal inter-frame gaps after the intervening packets; and
   timestamping the selected packet, along a packet bus, with the predicted departure time, wherein the timestamping occurs upstream from a transmit media access controller (TxMAC) while the selected packet transits the packet bus.

* * * * *